United States Patent [19]

Boutet

[11] Patent Number: 5,493,128
[45] Date of Patent: Feb. 20, 1996

[54] METHOD AND APPARATUS FOR INDEXING CASSETTES

[75] Inventor: John C. Boutet, Rochester, N.Y.

[73] Assignee: Eastman Kodak Company, Rochester, N.Y.

[21] Appl. No.: 296,336

[22] Filed: Aug. 25, 1994

[51] Int. Cl.⁶ .................................................. G03B 42/02
[52] U.S. Cl. ........................ 250/584; 250/588; 250/589
[58] Field of Search ................................... 250/589, 588, 250/584, 590

[56] References Cited

U.S. PATENT DOCUMENTS

| | | | |
|---|---|---|---|
| 4,743,758 | 5/1988 | Chan et al. | |
| 5,105,079 | 4/1992 | Boutet et al. | 250/228 |
| 5,107,116 | 4/1992 | Boutet. | |
| 5,151,592 | 9/1992 | Boutet et al. | 250/228 |
| 5,246,326 | 9/1993 | Boutet | 414/331 |
| 5,276,333 | 1/1994 | Robertson | 250/484.4 |
| 5,277,322 | 1/1994 | Boutet et al. | 211/41 |
| 5,278,410 | 1/1994 | Boutet et al. | 250/589 |
| 5,310,059 | 5/1994 | Robertson | 206/455 |
| 5,315,632 | 5/1994 | Flynn et al. | 378/167 |
| 5,328,019 | 7/1994 | Boutet et al. | 198/624 |
| 5,330,309 | 7/1994 | Brahm et al. | 414/411 |

FOREIGN PATENT DOCUMENTS 4-32829  2/1992  Japan ..................................... 250/589

Primary Examiner—Constantine Hannaher
Attorney, Agent, or Firm—Dana M. Schmidt

[57] ABSTRACT

A vertical autoloader capable of handling a variety of different size cassettes without the use of pallets, which includes a separator mechanism and an indexer mechanism. The separator mechanism has a plurality of partitions that define a plurality of slots, and the indexer mechanism has a plurality of partitions that define a plurality of slots corresponding to the slots defined by the partitions of the separator mechanism. An indexer drive mechanism moves the indexer mechanism with respect to a home position of the separator mechanism, wherein the slots defined by the partitions of the indexer mechanism are moved by one position with respect to the slots defined by the partitions of the separator mechanism. A separator drive mechanism moves the separator mechanism with respect to a home position of the indexer mechanism, wherein bottom surfaces of the slots defined by the partitions of the separator mechanism are located in a different plane than a plane in which the bottom surface of the slots defined by the partitions of the indexer mechanism are located.

31 Claims, 29 Drawing Sheets

Fig. 7
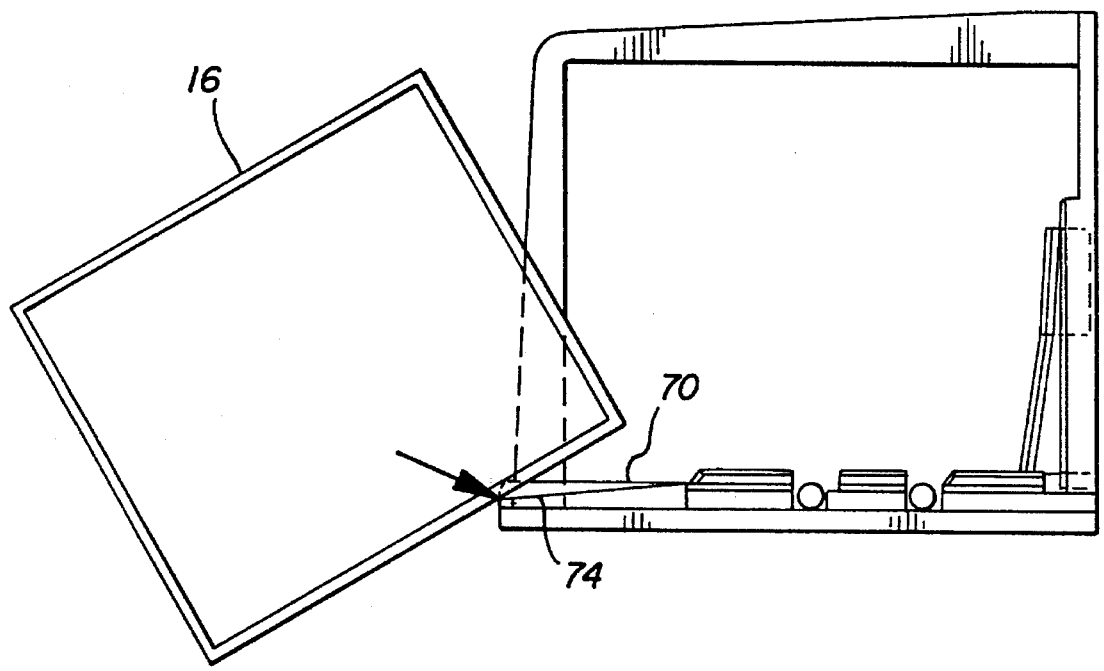
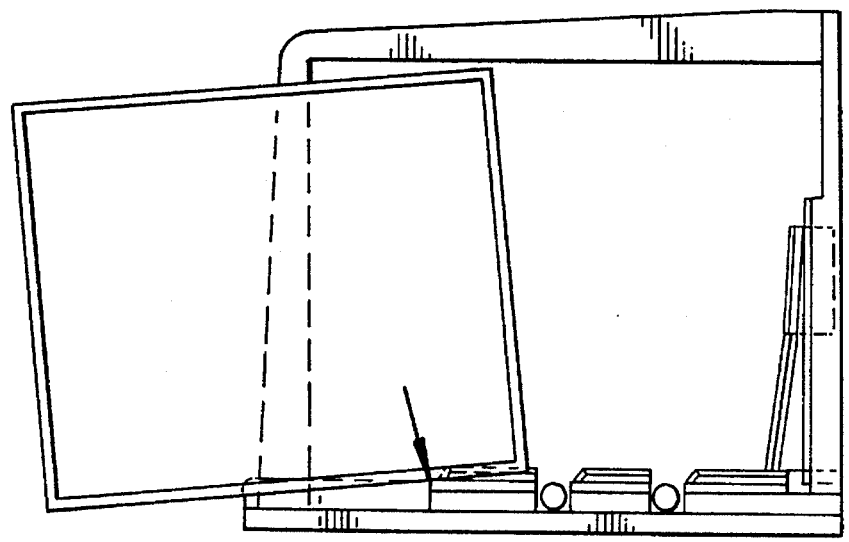
Fig. 8

Fig. 9
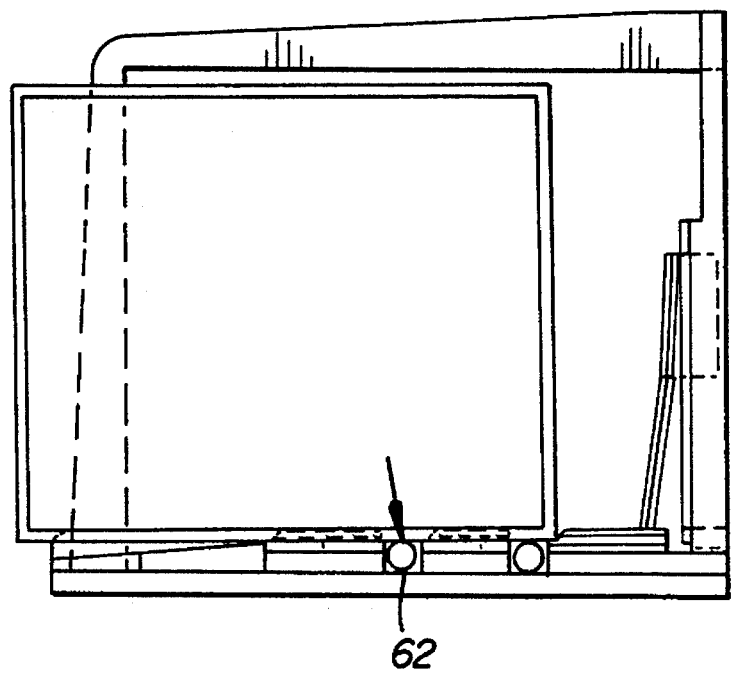
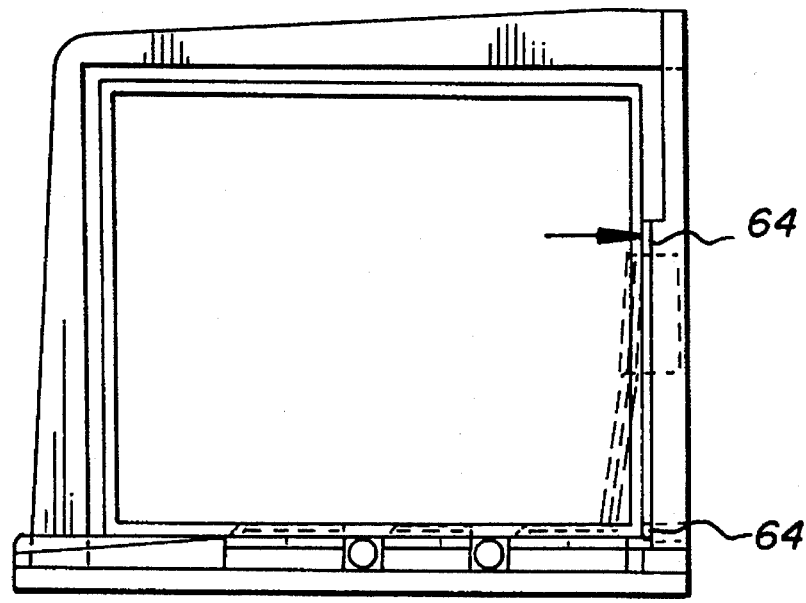
Fig. 10

METHOD AND APPARATUS FOR INDEXING CASSETTES

FIELD OF THE INVENTION

The invention relates in general to electronic image scanning systems. More specifically, the invention relates to a method and apparatus for indexing cassettes in a storage phosphor reader.

BACKGROUND

Electronic image scanning systems have been introduced for automatically scanning an exposed storage phosphorous element to generate electronic data representative of an image. The scanning systems incorporate a read unit that photoelectrically detects an image formed by scanning the storage phosphorous element with a stimulating radiation. Once scanned by the reading unit, the storage phosphorous element is erased by an erase unit for subsequent use.

It is desirable to locate the storage phosphorous element, for example a film sheet or plate, within a protective cassette for handling purposes. U.S. Pat. Nos. 5,310,059 and 5,276,333 issued to Robertson, for example, illustrate cassettes for use with an x-ray storage phosphorous plate. A hooked extractor of the type described in U.S. Pat. No. 5,330,309 issued to Brahm et al., incorporated herein by reference, is used to extract the storage phosphorous plate from the cassette for presentation to a read unit and erase unit of a scanning system as described above. Once erased, the storage phosphorous plate is inserted back into the protective cassette.

In order to improve processing efficiency, an autoloader device has been developed to automate the presentation of a plurality of cassettes to the extractor, thereby relieving the operator of the tedious task of loading individual cassettes. For example, U.S. Pat. No. 5,328,019 issued to Boutet et al., incorporated herein by reference, discloses an autoloader mechanism that utilizes cog belts to index a plurality of cassettes to a read site for extraction. A pinch roller drive assembly is used to advance the cassettes at the read site into a cassette clamping mechanism, for example of the type disclosed in U.S. Pat. No. 5,315,632 issued to Flynn et al., incorporated herein by reference, so that the hooked extractor described above can extract the storage phosphorous plate from the protective cassette.

One drawback to the use of the abovedescribed autoloader is that the cog belts are designed to accept a specific size cassette. It is common in the medical imaging field, however, to utilize cassettes of varying sizes for different imaging applications. In order to accommodate different sized cassettes, the cog belts are designed with a horizontal separation distance that accepts the largest of the cassettes to be utilized and smaller cassettes are then placed in a pallet having dimensions equivalent to the largest cassette. The pallets are then loaded in the autoloader in the same manner as the largest cassettes.

The use of the pallets requires additional manual operations for the operator and creates storage problems when the pallets are not being utilized. Accordingly, it would be desirable to provide an autoloader that automatically indexes cassettes of varying sizes without requiring the use of a pallet.

SUMMARY OF THE INVENTION

The invention provides a vertical autoloader that automatically indexes cassettes of varying sizes without requiring the use of a pallet. The vertical autoloader can also be a plurality of scanner unit configurations to reduce the overall floorspace footprint required by the combined autoloader and scanner.

The vertical autoloader includes a separator mechanism having a plurality of partitions that define a plurality of slots and an indexer mechanism which has a plurality of partitions that define a plurality of slots corresponding to the slots defined by the partitions of the separator mechanism. An indexer drive mechanism moves the indexer mechanism with respect to a home position of the separator mechanism, wherein the slots defined by the partitions of the indexer mechanism are moved by one position with respect to the slots defined by the partitions of the separator mechanism. A separator drive mechanism moves the separator mechanism with respect to a home position of the indexer mechanism, wherein bottom surfaces of the slots defined by the partitions of the separator mechanism are located in a different plane than a plane in which the bottom surface of the slots defined by the partitions of the indexer mechanism are located.

The separator mechanism preferably includes a rear separator and a bottom separator and the indexer mechanism includes a rear indexer and a bottom indexer, wherein the slots defined by the partitions of the separator and indexer mechanisms include horizontally oriented slots formed by the partitions of the bottom separator and bottom indexer and vertically oriented slots formed by the partitions of the rear separator and rear indexer.

In order to keep cassettes properly registered after each indexing operation, at least one transport roller extending perpendicular to the horizontally oriented slots is preferably provided. The transport roller includes a plurality of drive rollers mounted to a drive shaft, each of the drive rollers corresponding to one of the horizontally oriented slots. The interface of the drive rollers to the drive shaft constitutes a slip clutch.

In operation, the separator drive mechanism moves the bottom separator vertically and the indexer drive mechanisms moves the bottom indexer vertically and horizontally. The indexer drive mechanism also moves the rear indexer in a first horizontal direction and a second horizontal direction perpendicular to the first horizontal position, while the separator drive mechanisms moves the rear separator only in the second horizontal direction. The cycling operation of the indexers and separators causes cassettes to be indexed to a read site of the vertical autoloader.

In order to accommodate emergency situations requiring the immediate scanning of a cassette, an ejection mechanism is provided to eject a cassette located at a position adjacent the read site from the vertical autoloader.

Various configurations of the vertical autoloader in combination with a scanner unit permit plates contained within the cassettes to be extracted from the cassettes in a vertical plane. The vertical plane extraction permits the overall floorspace footprint of the autoloader/scanner combination to be reduced as compared with conventional systems.

BRIEF DESCRIPTION OF THE DRAWINGS

The invention will be described in greater detail with reference to the accompanying drawings, wherein:

FIGS. 7–10 are side views of the loading station shown in FIG. 4 that illustrate the placement of a cassette into the loading station;

DETAILED DESCRIPTION OF THE PREFERRED EMBODIMENTS

Figure 1:
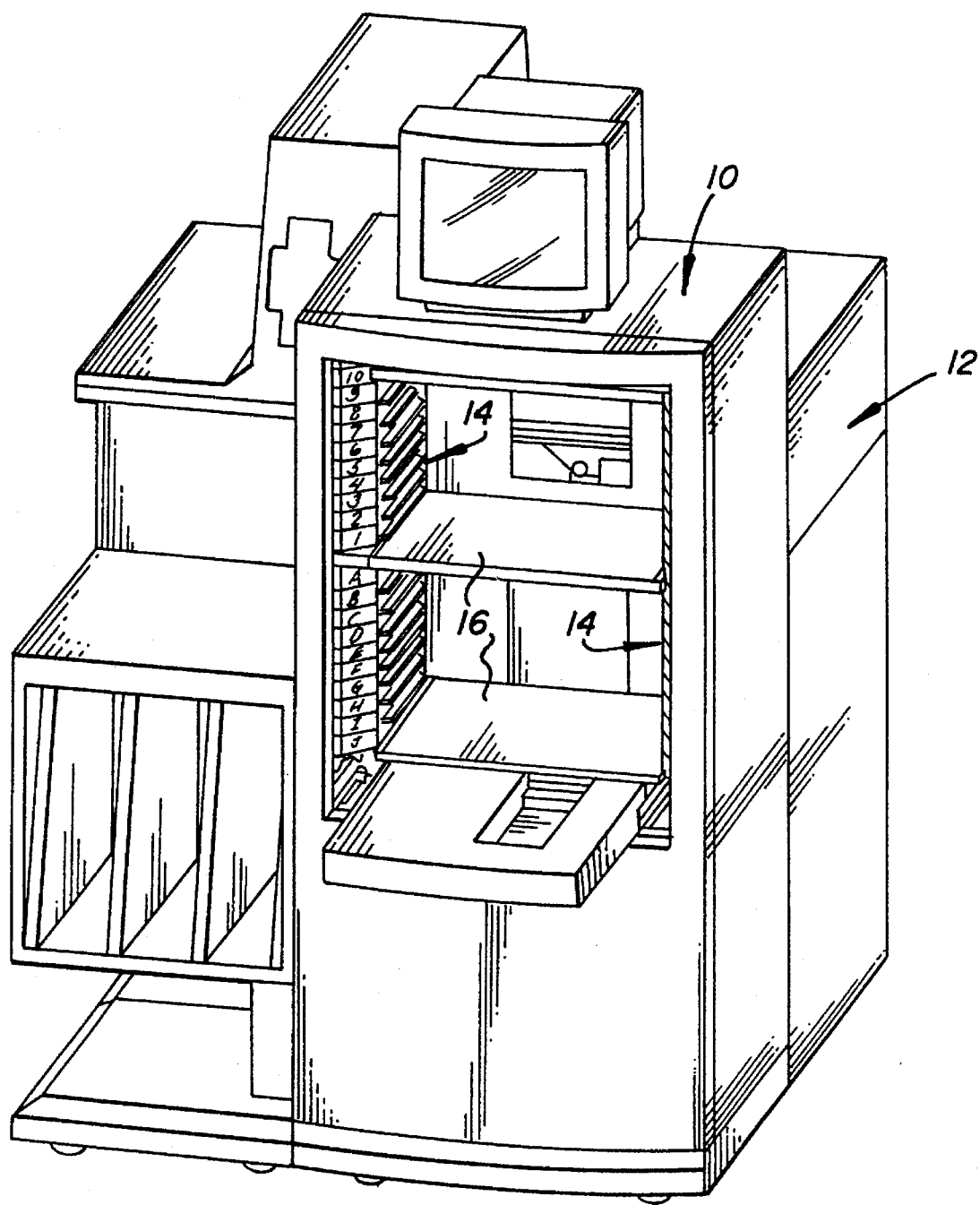
FIG. 1 is a perspective view of a conventional autoloader and scanner.

A front perspective view of a conventional cassette autoloader 10 coupled to a conventional scanning unit 12 of the type described in U.S. Pat. No. 5,328,019 is shown in FIG. 1. The cassette autoloader 10 includes cog belts 14 that are used to index cassettes 16 from loading positions (1–10) to a read site for extraction of the storage phosphorous plates from the cassettes 16. Once the cassettes have been read, erased and inserted back into the cassettes, the cog belts 14 index the cassettes 16 to unloading positions (A–J).

Figure 2:
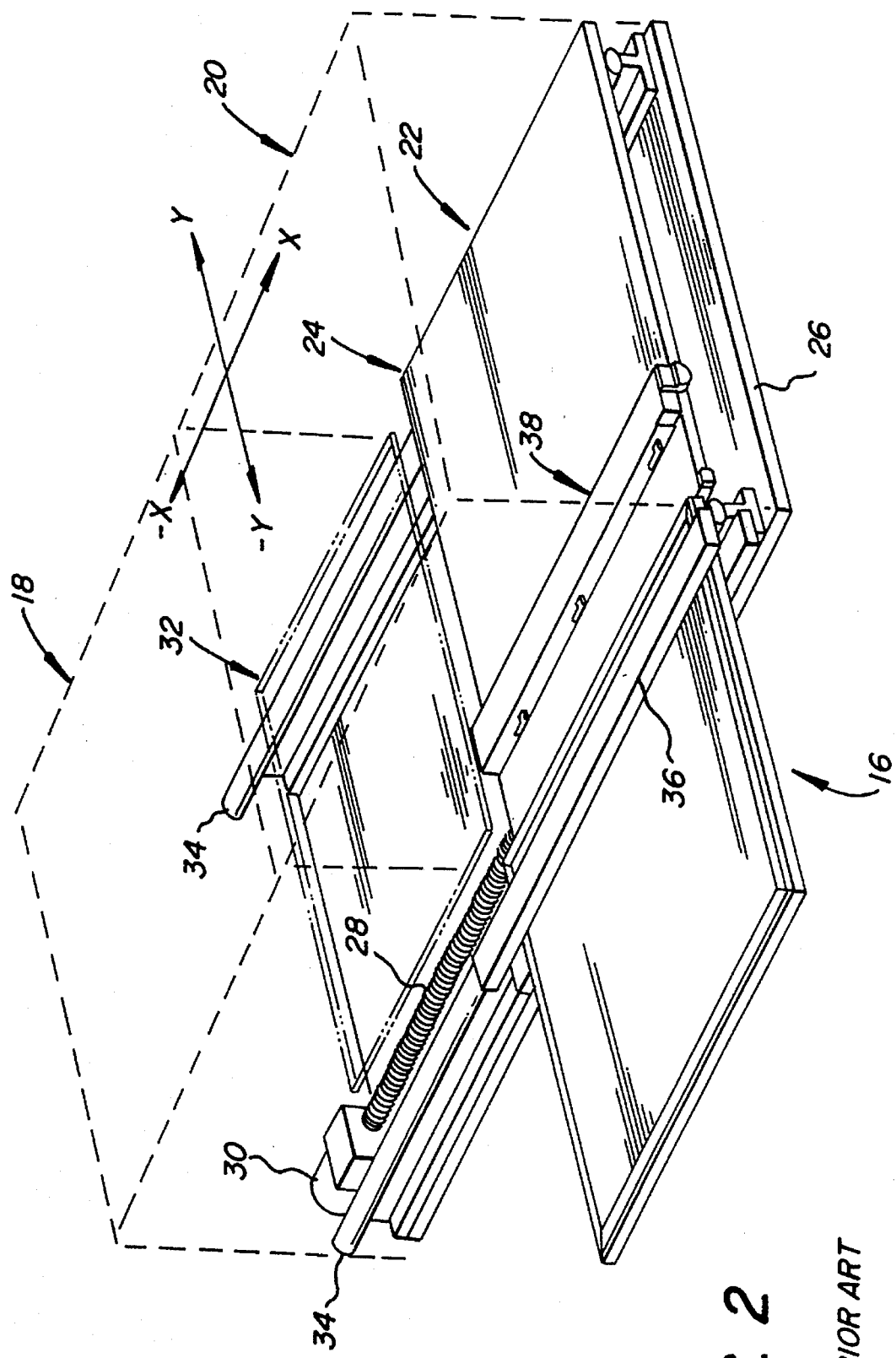
FIG. 2 illustrates an extractor mechanism and transport table of the scanner illustrated in FIG. 1.

The scanner unit 12 illustrated in FIG. 1 includes a read unit 18 and an erase unit 20 (shown in dashed lines in FIG. 2) that are arranged to receive and process the storage phosphorous plate in the same horizontal plane as the cassettes 16 are loaded in the autoloader 10. The read unit 18 includes a scanner and collector mechanism of the type described in any one of U.S. Pat. Nos. 4,743,758, 5,105,079, 5,107,116 and 5,151,592, the contents of which are incorporated herein by reference. The erase unit 20 includes a light source, for example a plurality of fluorescent tubes, that illuminate the plate during an erase operation. The plates are extracted and transferred between the read unit 18 and erase unit 20 by a transport mechanism 22 of the type described in U.S. Pat. No. 5,330,309. The transport mechanism 22 includes a movable stage 24 that is mounted to a base plate 26. The movable stage 24 includes a drive screw 28 that is driven by a motor 30. The drive screw 28 is threaded into a drive nut (not shown) that engages the movable stage 24 by an element (not shown), so as to move the stage 24 from a receiving position beneath the erase unit 20 to a scanned position 32 within the read unit 18 (illustrated in phantom) along guide rails 34.

In operation, a cassette 16 is clamped in position at the read site by a clamping mechanism 36 of the type described in U.S. Pat. No. 5,315,632. An extractor bar assembly 38, designed for movement to and away from the cassette 16, is then moved into position to extract the plate contained in the cassette. The extractor bar assembly 38 pulls the plate onto the movable stage in the receiving position beneath the erase unit 20. The movable stage 24 is then indexed to the scanned position 32 at a constant speed during which time the plate is scanned by the read unit 18. Once scanning is complete, the movable stage 24 is returned to the receiving position and the erase unit 20 is activated to erase the plate. The extractor bar assembly 38 then returns the plate to the cassette 16.

In the conventional scanning unit 12 described above, the cassette 16 is located at the read site (centered between the loading positions and the unloading positions) by the autoloader 10, removed from the cassette 16, and processed in the same horizontal plane. In order for the cog belts 14 of the conventional autoloader 10 to support different size cassettes, the cassettes must first be loaded into pallets having outer dimensions that match the horizontal displacement between the cog belts 14, as the cassettes 16 are held and positioned with respect to the read site using to parallel edges (right and left sides) of the cassettes 16 or pallets. The use of the pallets requires additional manual operations on the part of the operator and also requires additional storage space for the pallets when they are not being utilized.

Figure 3:
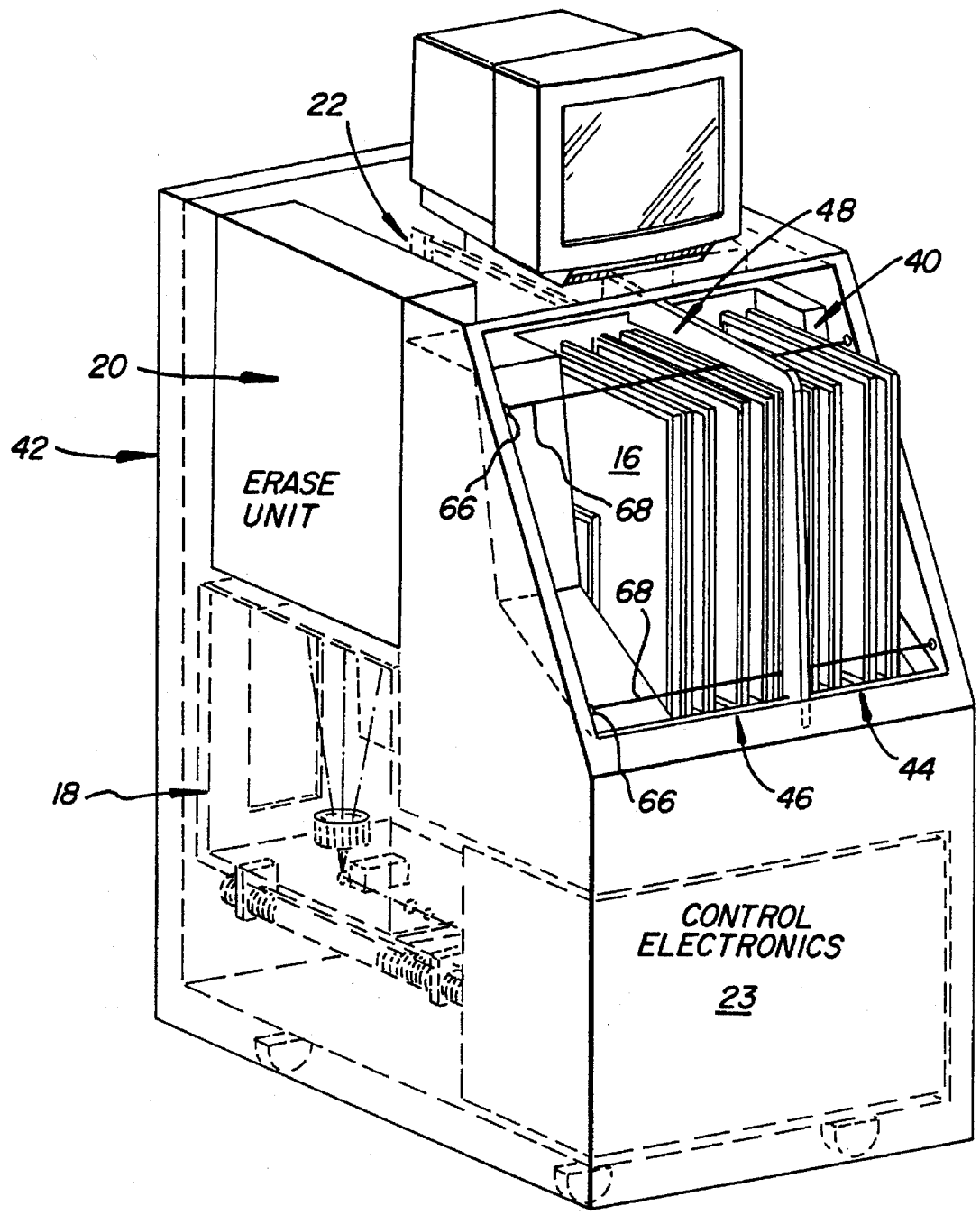
FIG. 3 is a perspective view of a vertical autoloader coupled to a modified scanner in accordance with the invention.

The present invention overcomes the problems associated with the use of pallets to handle different size cassettes by providing an autoloader in which the cassettes are vertically oriented, wherein the cassettes are positionally registered to a read site by using two intersecting edges of the cassettes. Referring now to FIG. 3, a vertical autoloader 40 in accordance with the invention is shown coupled to a modified scanning unit 42. The modified scanning unit 42 utilizes the same read unit 18, erase unit 20 and transport mechanism 22 of the conventional scanning unit 12 shown in FIG. 1. The read unit 18, erase unit 20 and transport mechanism 22, however, have been rotated by 90 degrees so that the transport mechanism 22 receives cassettes 16 in a vertical orientation from the vertical autoloader 40. Movement of plates extracted from the cassettes 16 between the read unit 18 and the erase unit 20 is therefore in a vertical plane. The vertical autoloader 40 includes a loading station 44 and an unloading station 46 separated by a read site that is covered by a read position guard 48. The vertical autoloader 40 will be described in greater detail with reference to the loading station 44 for purposes of simplification. The operation and structure of the unloading station 46, however, is identical to that of the loading station 44.

Figure 4:
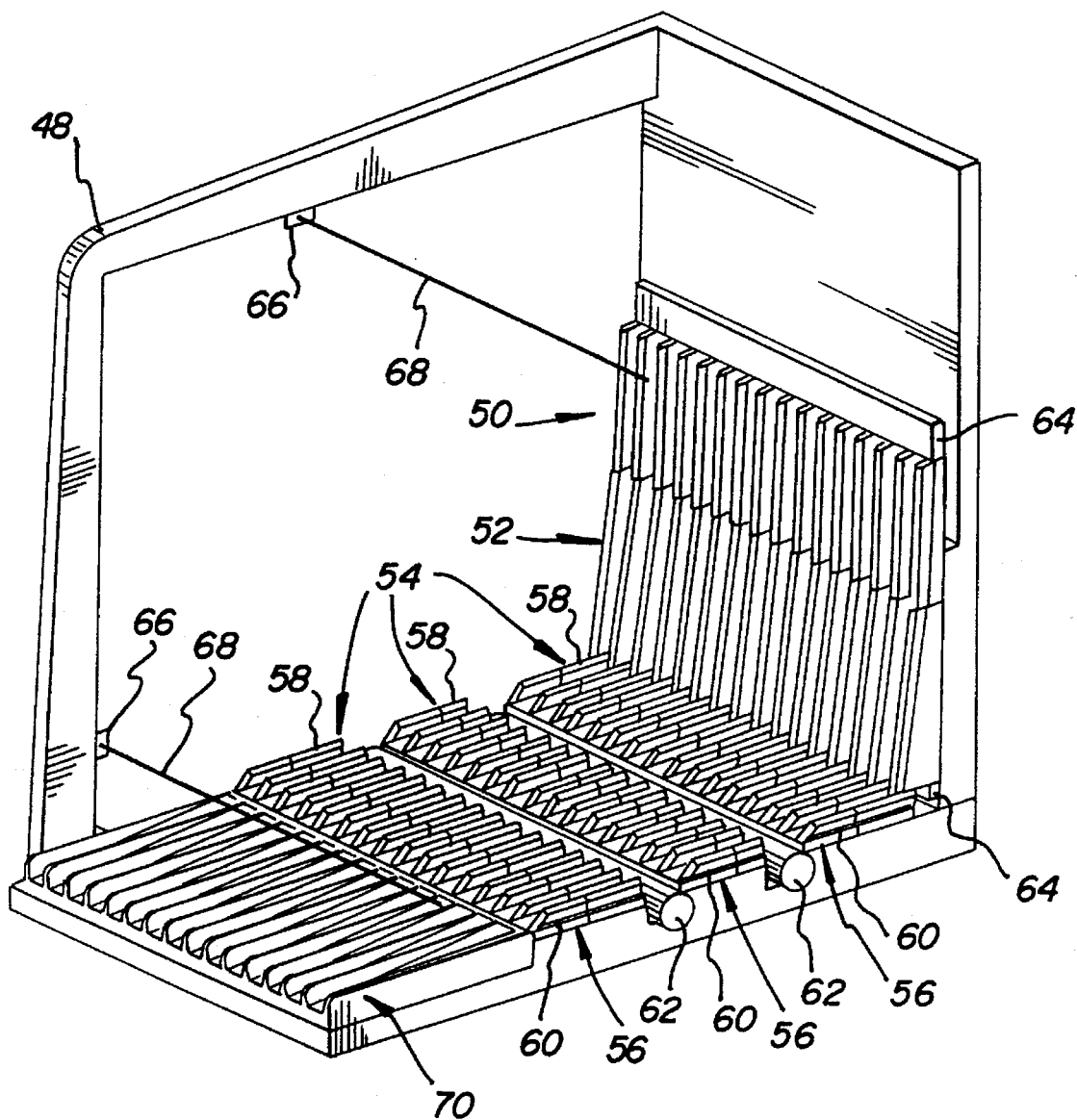
FIG. 4 is a perspective view illustrating a loading station of the vertical autoloader illustrated in FIG. 3.
Figure 5:
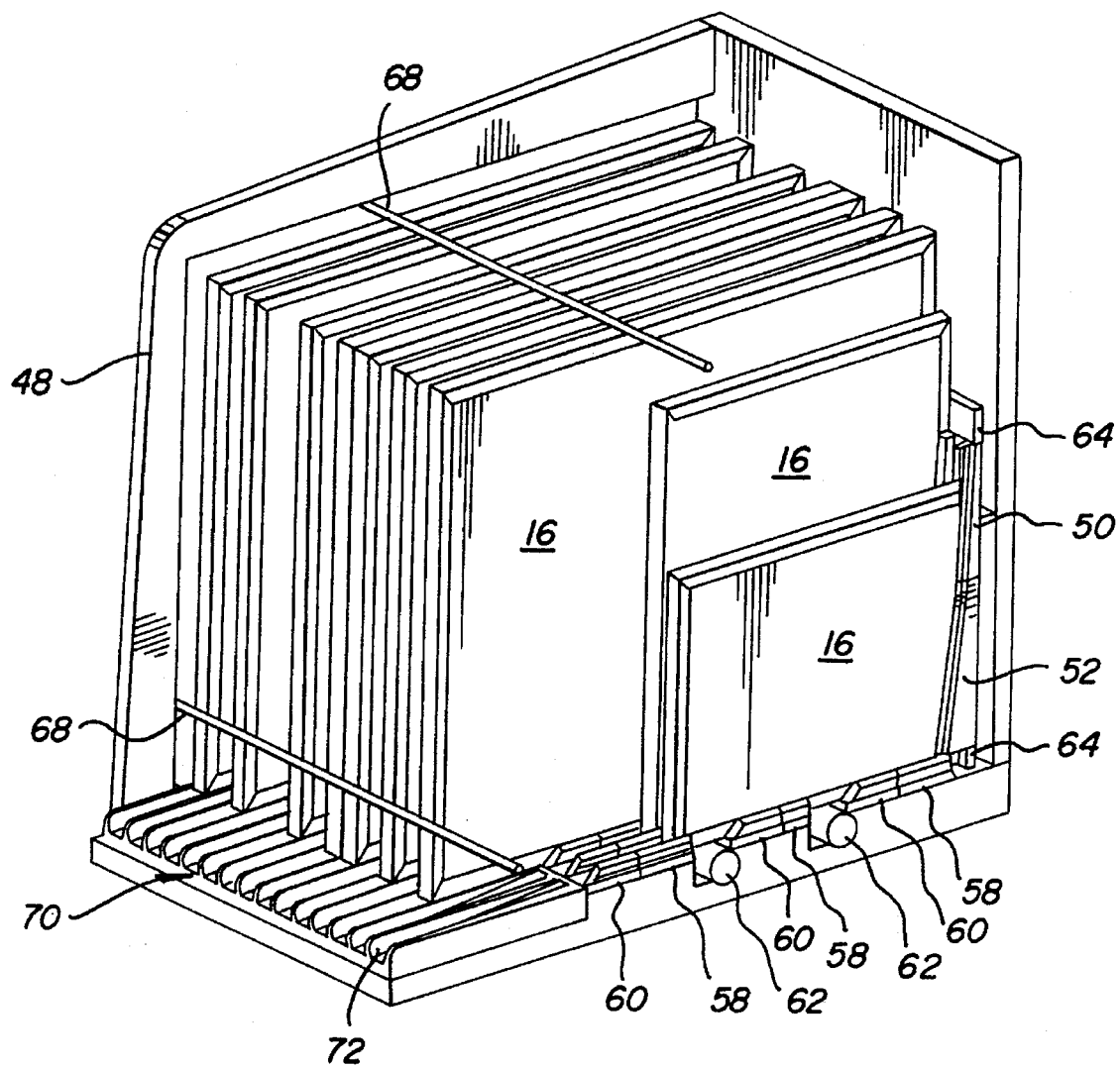
FIG. 5 is a perspective view of the loading station illustrated in FIG. 4 loaded with cassettes.
Figure 6:
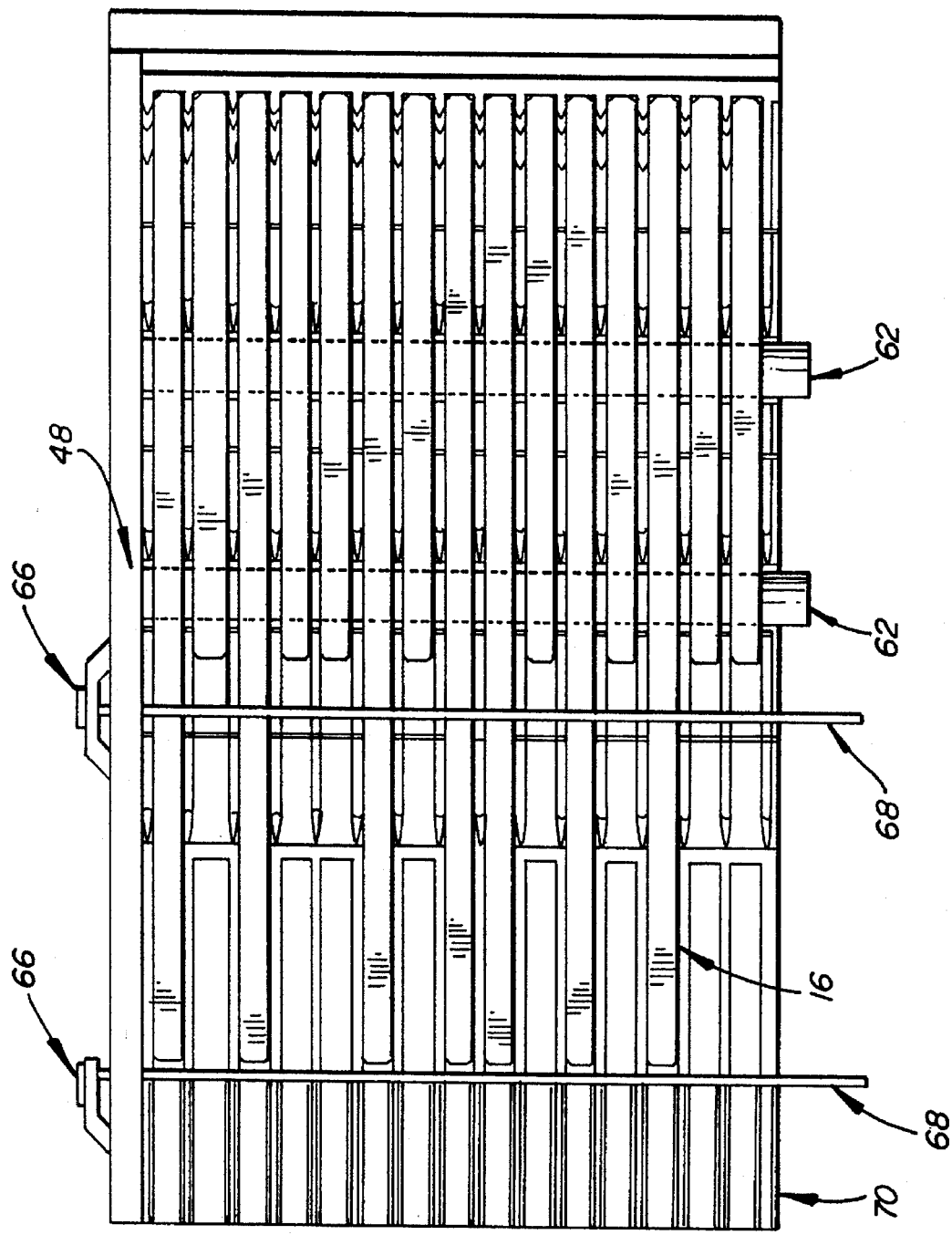
FIG. 6 is a top view of the loading station illustrated in FIG. 4 loaded with cassettes.

A perspective view of the loading station 44 is illustrated in FIG. 4. The loading station 44 incorporates indexer and separator mechanisms that include a movable rear indexer 50, a movable rear separator 52, a movable bottom indexer 54 and a movable bottom separator 56, each of which includes a plurality of partitions or fins which define a plurality of cassette locating slots. The locating slots defined by the rear indexer 50 and rear separator 52 are vertically oriented, while the locating slots defined by the bottom indexer 54 and bottom separator 56 are horizontally oriented. The bottom indexer 54 and the bottom separator 56 preferably include a plurality of indexer elements 58 and separator elements 60 (three each in the illustrated embodiment) having transport rollers 62 located therebetween. The transport rollers 62 are utilized to insure that the cassettes 16 are properly positioned against stop pads 64 after each indexing operation as will be described in greater detail. The read position guard 48 or left side plate (not shown in FIG. 4) includes optical position sensors 66 that detect out-of-position cassettes when radiation beams 68, generated from transmitters (not shown) located on a right side plate (not shown) of the loading station 44, are broken. FIG. 3 shows radiation beams 68 extending between the left and right cabinet side plates to detect out-of-position cassettes in both the loading station 44 and the unloading station 46. An entrance guide 70 is preferably utilized to provide a plurality of guide slots that align with the cassette locating slots defined by the indexer and separator mechanisms. FIG. 5 is a perspective view and FIG. 6 is a top view illustrating various size cassettes 16 loaded in the loading station 44.

The actual loading of the cassettes 16 into the loading station 44 is illustrated in FIGS. 7–10. As shown in FIG. 7, a cassette 16 first makes contact with the entrance guide 70 which reduces wear on the indexer elements 58 and separator elements 60, and their associated drive mechanisms which will be described in greater detail below, by absorbing the first phase of impact of cassette insertion. Specifically, the operator introduces the cassette 16 so that it is tilted back slightly, and drops the bottom edge of the cassette 16 between entrance guide partitions 72 (See FIG. 5) that define a guide slot of the entrance guide 70, wherein the cassette 16 strikes a leading edge of a sloped channel 74 that defines the bottom of the guide slot. The cassette 16 is then rotated about a pivot point to bring the bottom edge thereof to a horizontal position, and the cassette 16 is then inserted into a cassette guide slot defined by the partitions of the indexer elements 58 and separator elements 60 (FIGS. 8 and 9) until fully seated against the stop pads 64 as shown in FIG. 10. The entrance guide 70 ensures that the cassette 16 is aligned with the partitions of the indexer elements 58 and separator elements 60 when the cassette 16 is rotated to the horizontal orientation. The entrance guide partitions 72 are tapered so that they are thinnest at their top leading edge corner and are widest at their root where their width is equal to that of the partitions of the indexer elements 58 and the separator elements 60, which also have tapered edges so that the cassette 16 can slide down between them with minimum resistance and vibration.

Figure 11:
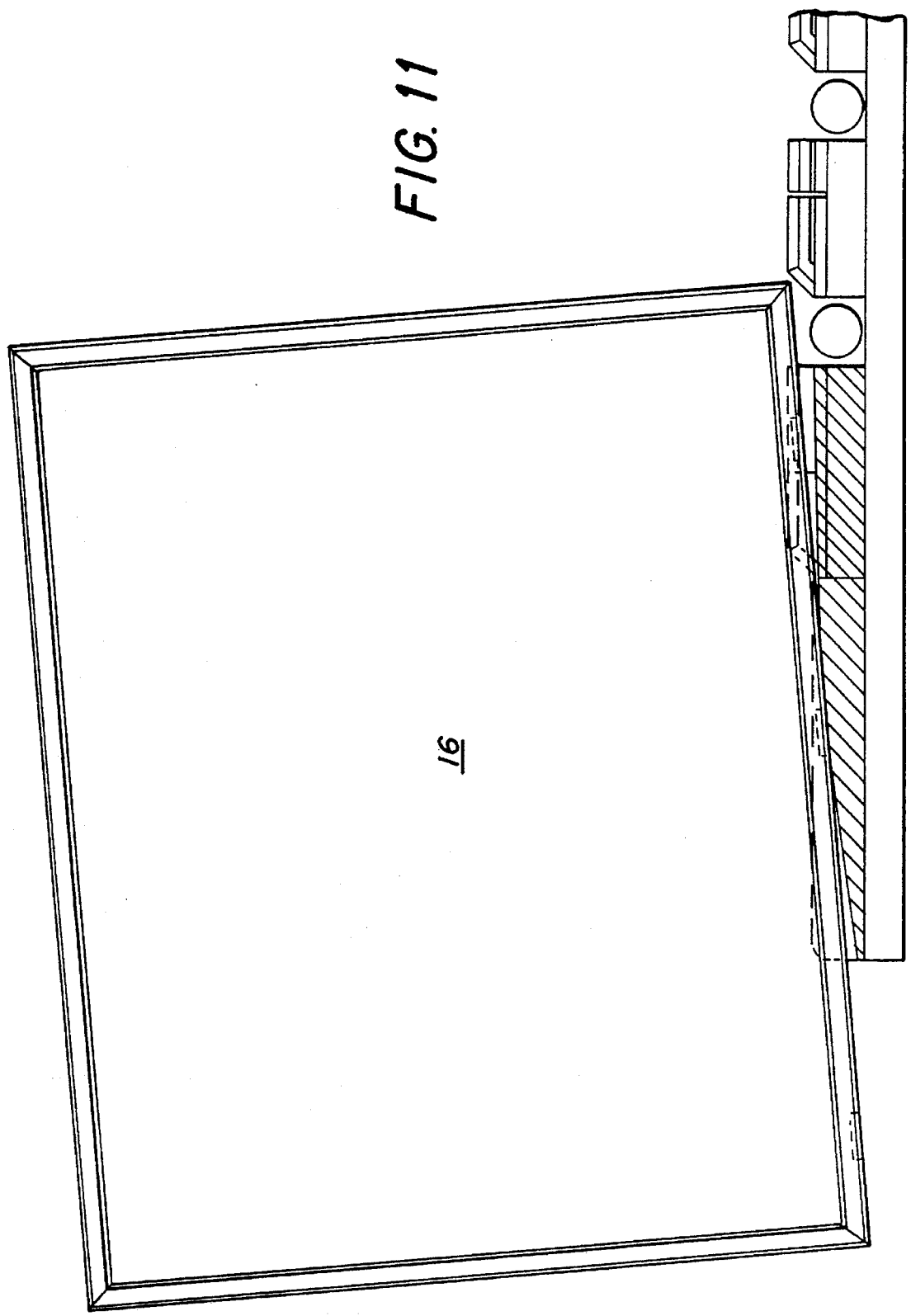
FIG. 11 is a side view of the loading station shown in FIG. 4 illustrating the curved surface of an entrance guide.

As depicted in FIGS. 7–10, four potential impact phases are encountered during cassette insertion including: impact with the leading edge of the entrance guide 70; impact with the sloped channel 74 as the cassette 16 is rotated; impact with the indexer elements 58, separator elements 60 and drive roller 62; and impact with the stop pads 64 as the cassette 16 is fully seated. The entrance guide 70 is preferably manufactured from a shock absorbing material or is mounted to the vertical autoloader 40 by means of shock mounts to reduce the transmission of vibrations to the reader 42 from the phase 1 impact. The phase 2 impact is minimized by making the bottom surface of the first indexer and separator elements curved in conjunction with the sloped channel 74 of the entrance guide 70, as shown in greater detail in FIG. 11, so that the bottom edge of the cassette 16 has a rolling contact point as it rotates to the horizontal position. An elastomer coating on the drive rollers 62 is preferably utilized to minimize phase 3 impact shock. Phase 4 impact shock is minimized by making the stop pads 64 from an energy absorbing material.

Figure 12:
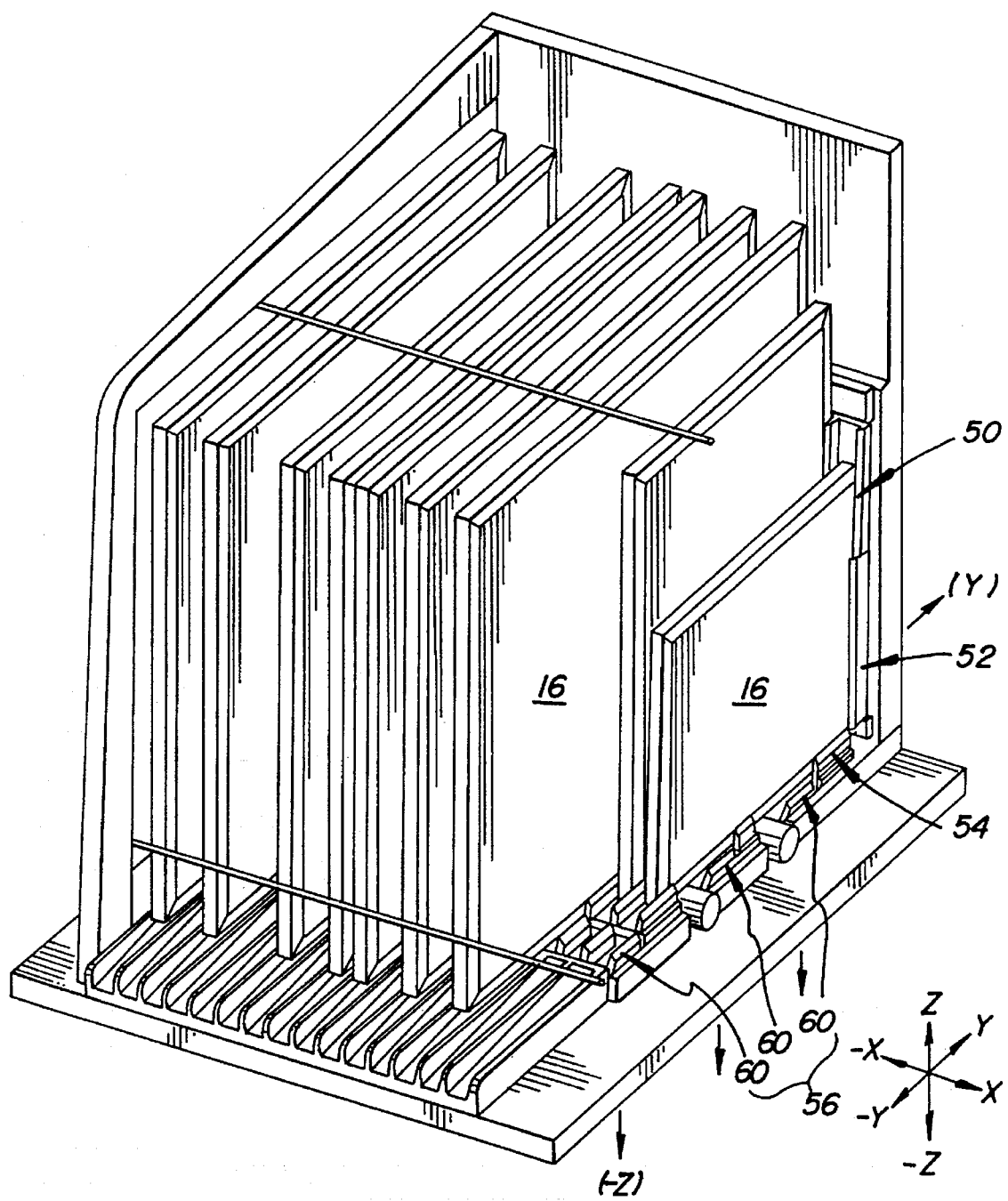
FIGS. 12–17 are perspective views of the loading station illustrated in FIG. 4 as cassettes are indexed.
Figure 13:
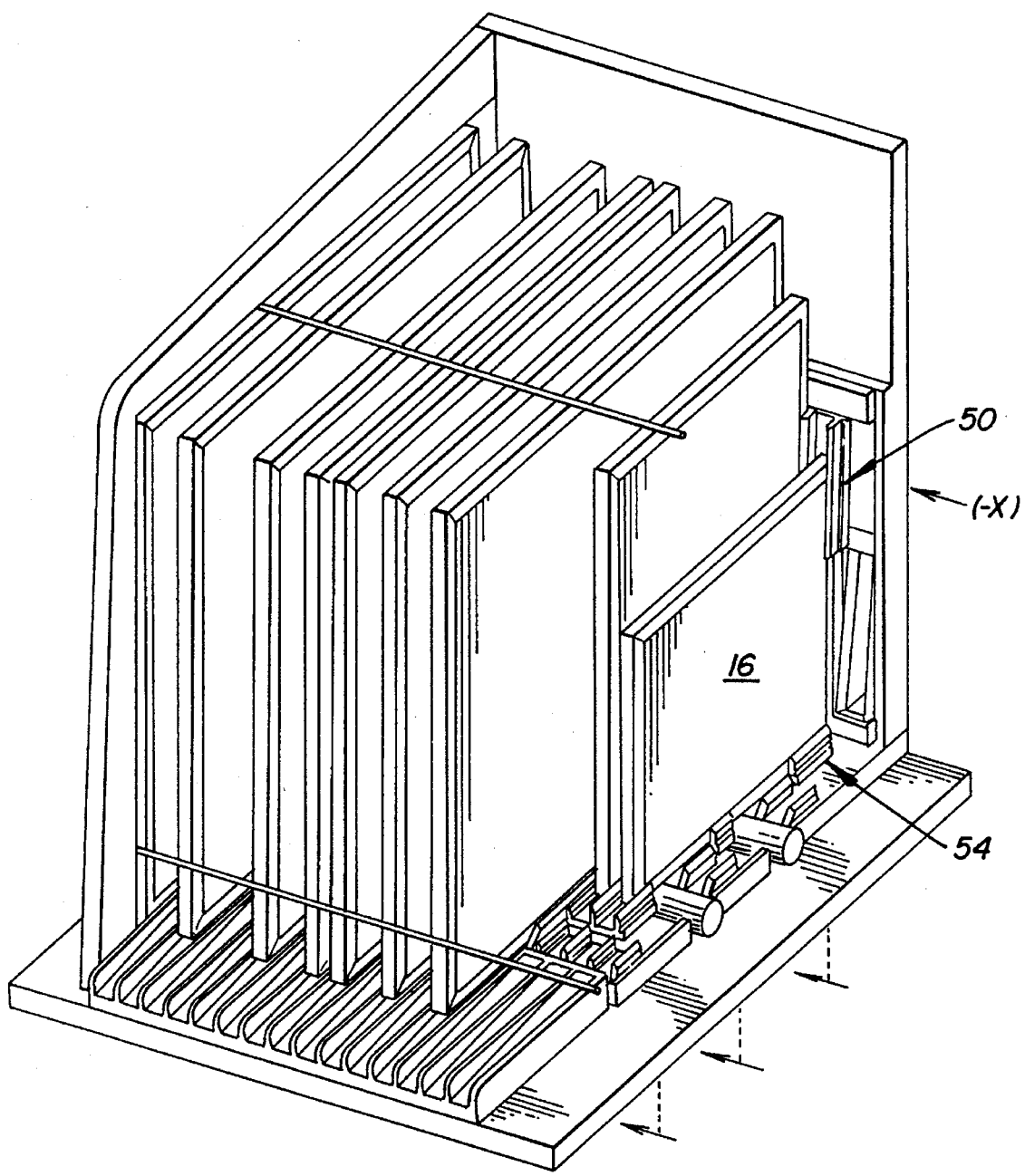
Figure 14:
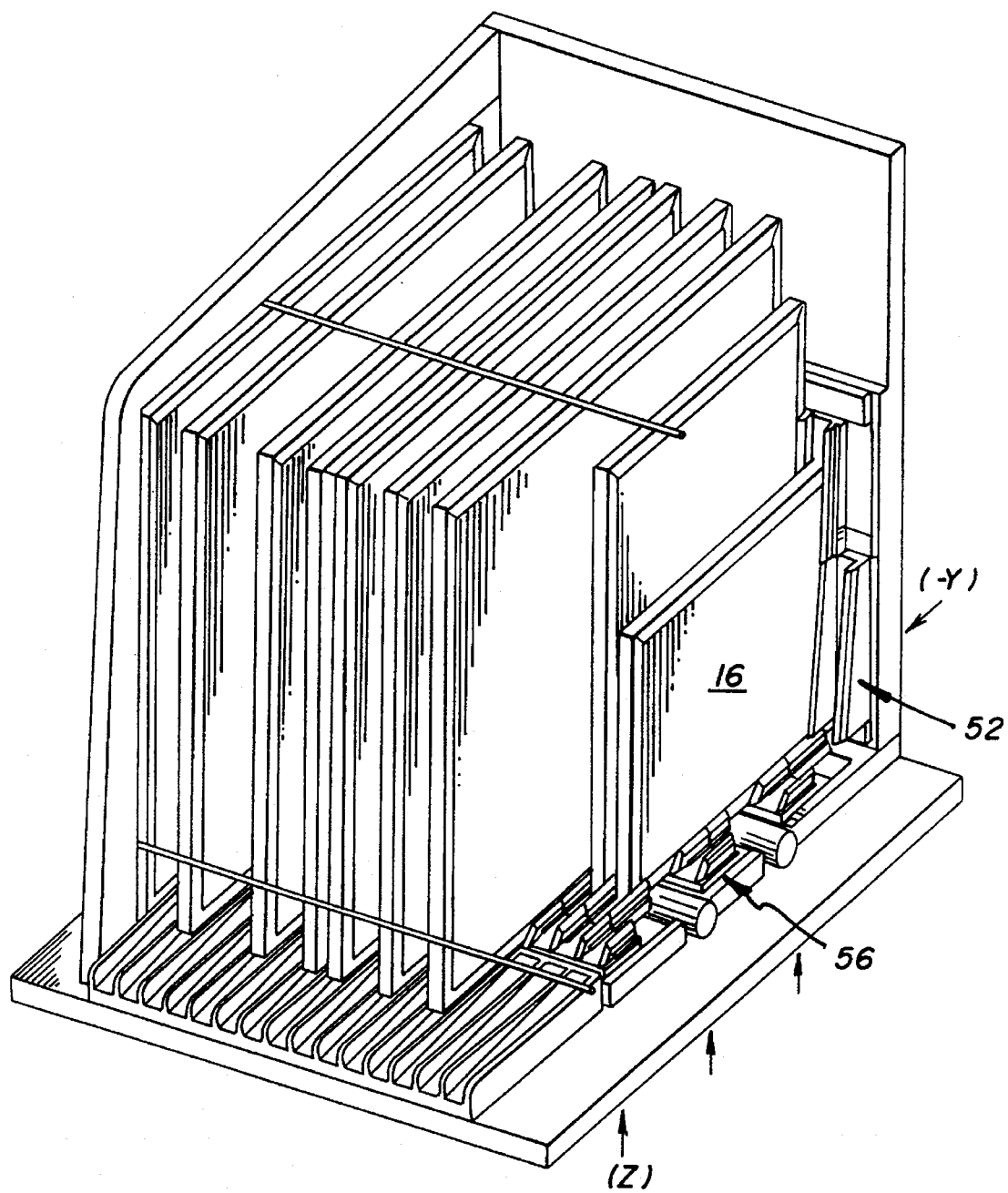
Figure 15:
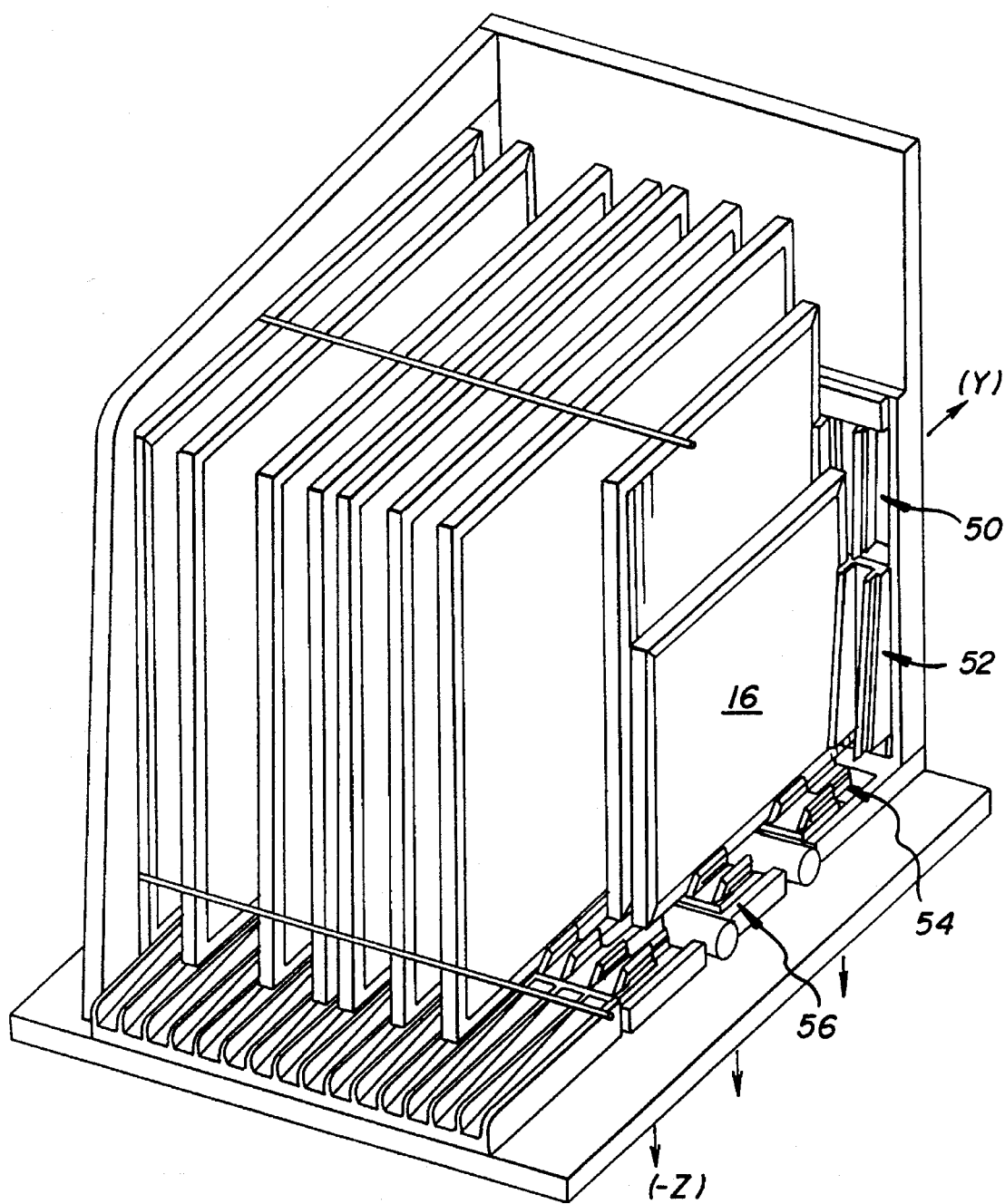
Figure 16:
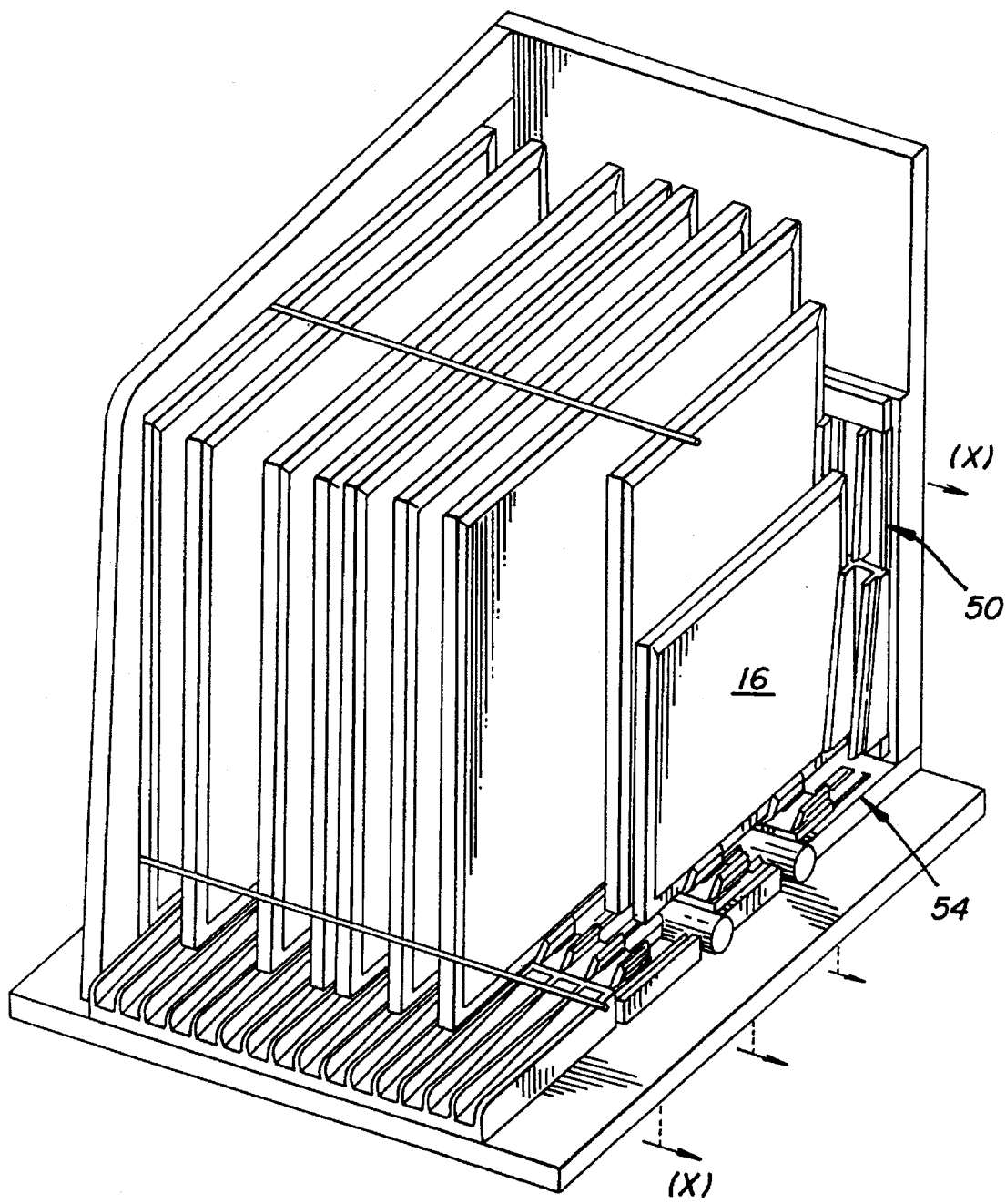
Figure 17:
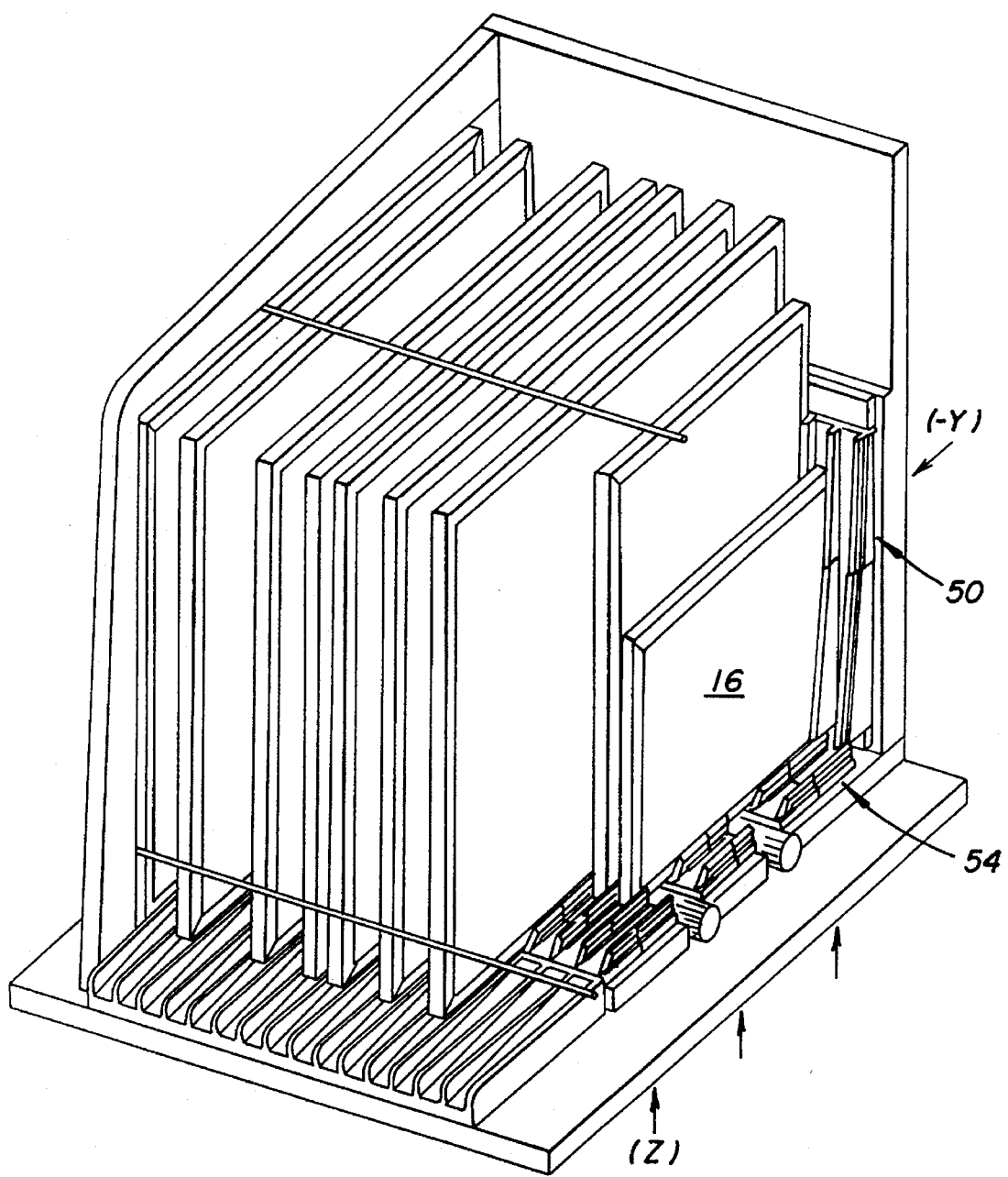

The operation of the rear indexer 50, rear separator 52, bottom indexer 54 and bottom separator 56 to index the cassettes toward the read site located under the read position guard 48 will now be described with reference to FIGS. 12–17. As shown in FIG. 12, the first step in indexing the cassettes 16 is to lower the separator elements 60 of the bottom separator 56 in a vertical direction (-Z) and move the rear separator 52 back in a horizontal direction (Y) so that the bottom and front edges the cassettes 16 are no longer located between the partitions of the bottom separator 56 and the rear separator 52. At this point, the cassettes 16 are retained solely by the rear indexer 50 and the bottom indexer 54. Referring to FIG. 13, the rear indexer 50 and the bottom indexer 54 are simultaneously moved in a horizontal direction (-X) perpendicular to the horizontal direction of movement of the rear separator (Y) by one position toward the read site, thereby causing all of the cassettes to be indexed accordingly. The rear separator 52 and the bottom separator 56 are then raised back (Z direction) to their initial home position as shown in FIG. 14. The rear indexer 50 is then retracted (Y direction) and the bottom indexer 54 is lowered (-Z direction) as shown in FIG. 15, so that the cassettes 16 are retained only by the rear separator 52 and bottom separators 56. As shown in FIG. 16, the rear indexer 50 and the bottom indexer 54, while still in the retracted and lowered positioned respectively, are moved back toward their starting position (X direction). Finally, as shown in FIG. 17, the rear indexer 50 is moved forward to its starting home position (-Y direction) and the bottom indexer 54 is raised (Z direction) to its starting home position. At this point, all of the cassettes 16 have been indexed toward the read site by one position and the indexer and separator mechanisms have been returned to their initial home position so that the indexing operation can be repeated.

It is possible that the movement of the indexing operation could cause one or more of the cassettes 16 to move out of contact with the stop pads 64. In the case of the largest size cassettes, incorrect positioning could cause the cassettes to jam against the read position guard 48. In such a case, the position sensors 66 detect the out of place cassette and the transport rollers 62 are activated to push the cassettes 16 back toward the stop pads 64. It is also preferable to operate the transport rollers 62 for a brief time just prior to an indexing operation, in order to insure that all cassettes are properly seated.

Figure 18:
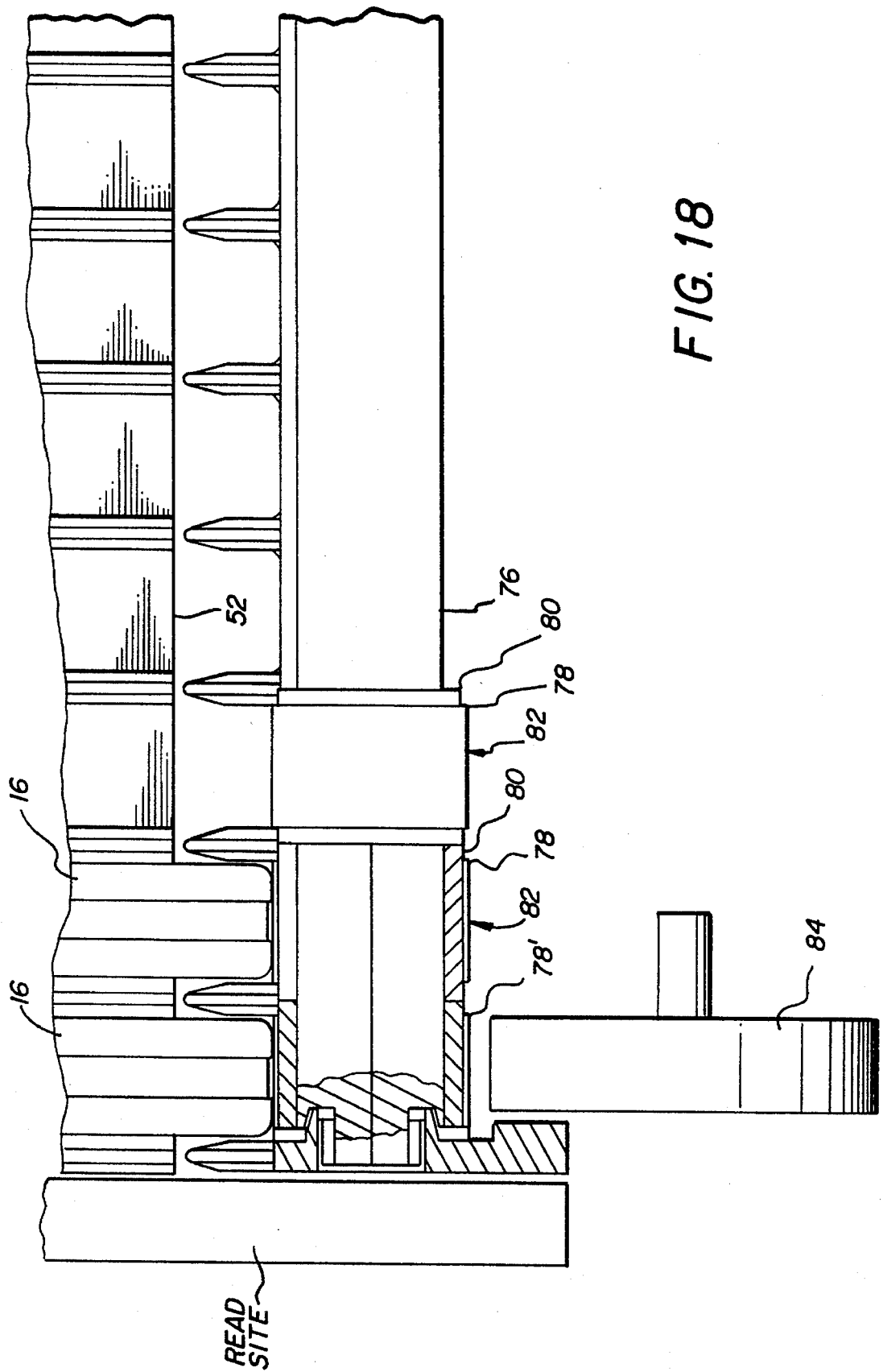
FIG. 18 is a detailed illustration of transport rollers utilized in the loading station illustrated in FIG. 4.

In the illustrated embodiment, two sets of transport rollers 62 are provided to ensure the full weight of the cassettes 16 are supported by the transport rollers 62 and adequate friction force is provided between the rollers 62 and the cassettes 16 to drive the cassettes against the rear stop pads 64. In their simplest form, the transport rollers 62 comprise full length rollers with a single drive surface extending the across the length of the loading station 44. The drawback to this simple design, however, is that the transport rollers 62 scuff against cassettes which have already been properly seated against the stop pads when unseated cassettes are being driven. The scuffing causes unacceptable wear on the cassettes 16 and the surfaces of the transport rollers 62. To avoid this problem, a segmented roller assembly of the type illustrated in FIG. 18 is utilized for the transport rollers 62. The segmented roller assembly includes a drive shaft 76 with a plurality of drive rollers 78 located thereon. The drive rollers 78 include a core 80 that is covered with a highfriction surface material 82, such as urethane, to minimize the chance of a drive roller 78 slipping relative to a cassette 16. The materials for the drive shaft 86 and roller cores 80 are chosen to provide proper friction and wear characteristics to ensure that the roller cores 80 slip on the drive shaft 76 when a cassette is properly seated against the stop pads 64, i.e., the interface between the roller cores 80 and the drive shaft 76 acts as a slip clutch thereby preventing slippage between the surface material 82 and the cassettes 16.

FIG. 18 also illustrates the use of an ejection mechanism including an ejection drive wheel 84 that is used to drive the drive roller 78' adjacent to the read site in a direction opposite to the drive direction of the drive shaft 76. The drive wheel 84 is used to eject the cassette adjacent to the read site to permit a "star" (emergency) cassette to be inserted. To accomplish this, the drive wheel 84 is raised into contact with the drive roller 78' adjacent to the read site causing the drive roller 78' to push the cassette 16 outward to a position where it can be readily removed by an operator. A star cassette is then inserted in the place of the ejected cassette.

Figure 19:
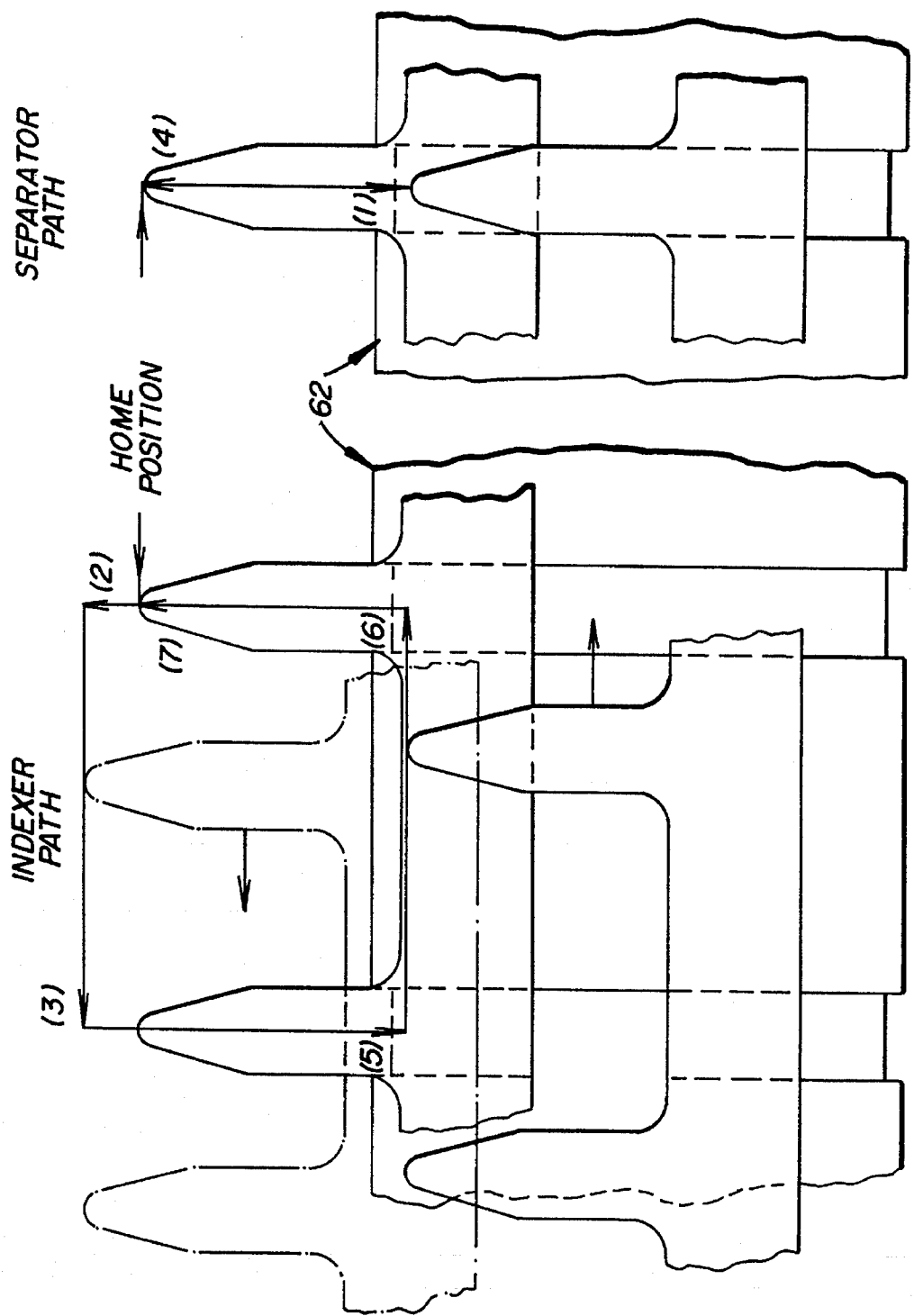
FIG. 19 illustrates the movement of a bottom indexer and bottom separator in a preferred indexing sequence.

It should be noted it is desirable that the cassettes are not resting on the drive rollers 78 during the portion of the indexing cycle when the cassettes 16 are being translated horizontally towards the read site. This is particularly important in the case of the use of a segmented roller assembly of the type shown in FIG. 18, since a cassette 16 pushed sideways across that roller assembly profile will tend to hang up on the grooves between the drive rollers 78. It is therefore desirable that the bottom indexer 54 lifts the cassettes 16 off the rollers 78 prior to an indexing operation. FIG. 19 represents a preferred indexing method in which the bottom separator 56 is lowered from a home position at step 1, the bottom indexer 54 is raised so that cassettes 16 supported by the bottom indexer 54 are above the level of the transport roller 62 at step 2, the bottom indexer 54 is then moved horizontally by one position at step 3, the bottom separator 56 is raised back to the home position at step 4, the bottom indexer 54 is lowered so the cassettes are supported by the bottom separator 56 at step 5, the bottom indexer 56 is then moved horizontally back toward the home position at step 6, and then raised back to the home position at step 7.

An alternative approach would be to normally have the transport rollers 62 recessed below the bottom of the indexer and separator elements, and then to lift the cassettes 16 with the transport rollers 62 when the transport rollers 62 are needed to drive the cassettes 16. Such an approach, however, would require another actuator mechanism to raise and lower the transport rollers 62. The transport rollers 62 would also be required to raise and lower a large mass of cassettes during a scanning operation, which might cause vibrations that would induce scanning artifacts. In contrast, the lifting of the cassettes 16 during the indexing operation as shown in FIG. 19 insures that any vibration caused by the movement of the cassettes 16 will not cause scanning artifacts, as scanning operations are not generally performed during indexing operations.

Figure 20:
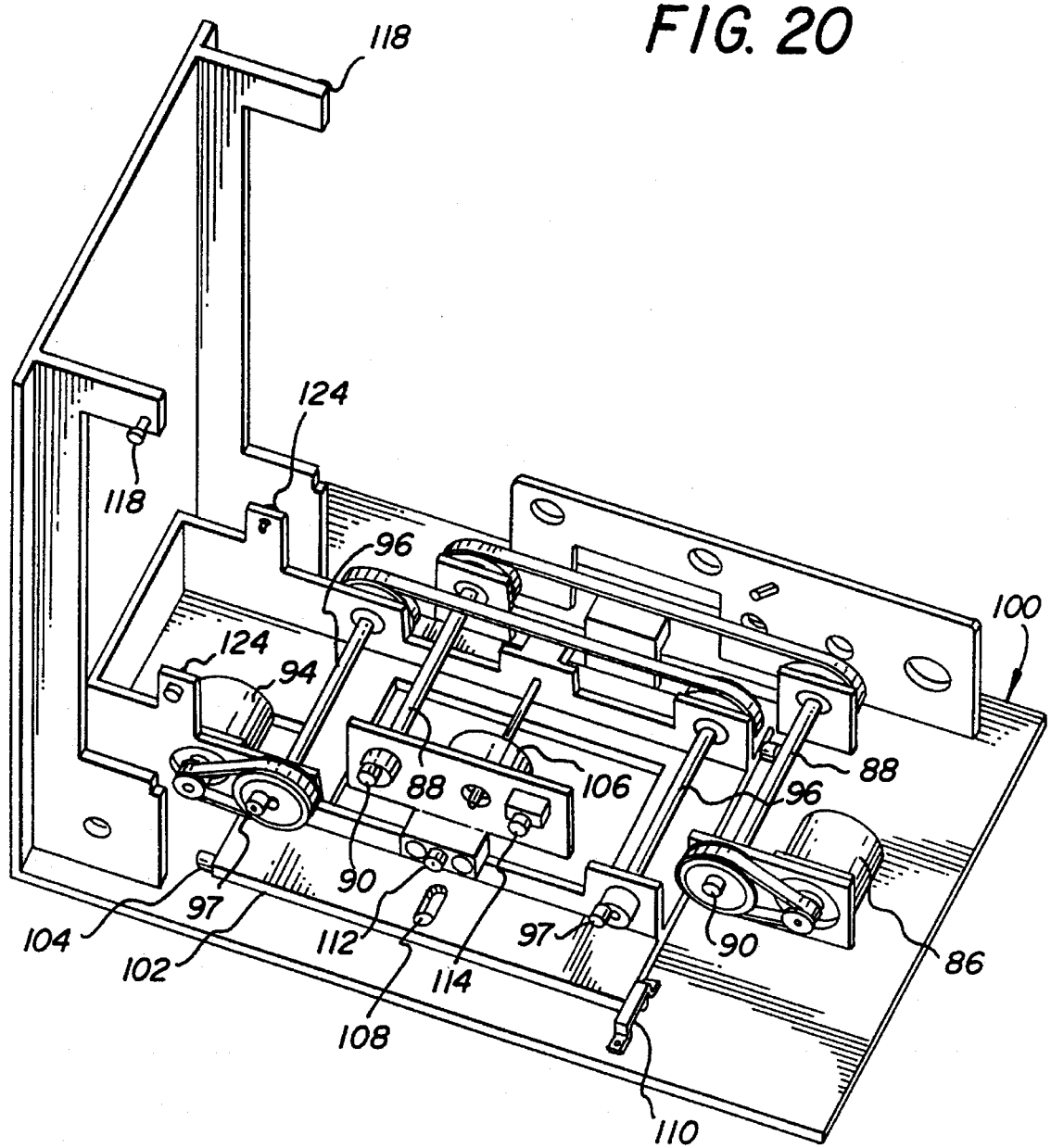
FIGS. 20–24 are partial assembly views of the loading station illustrated in FIG. 4.
Figure 21:
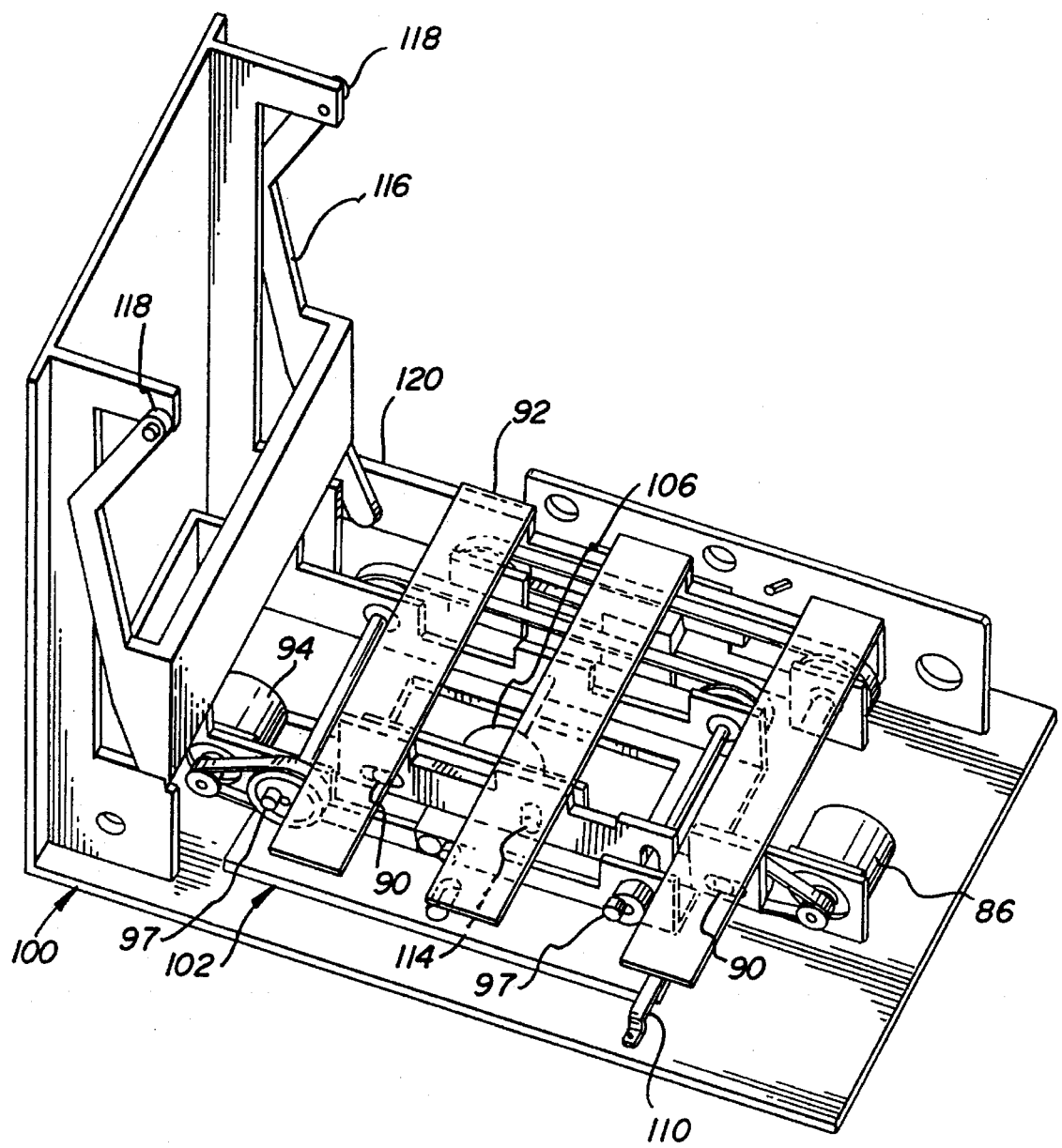
Figure 22:
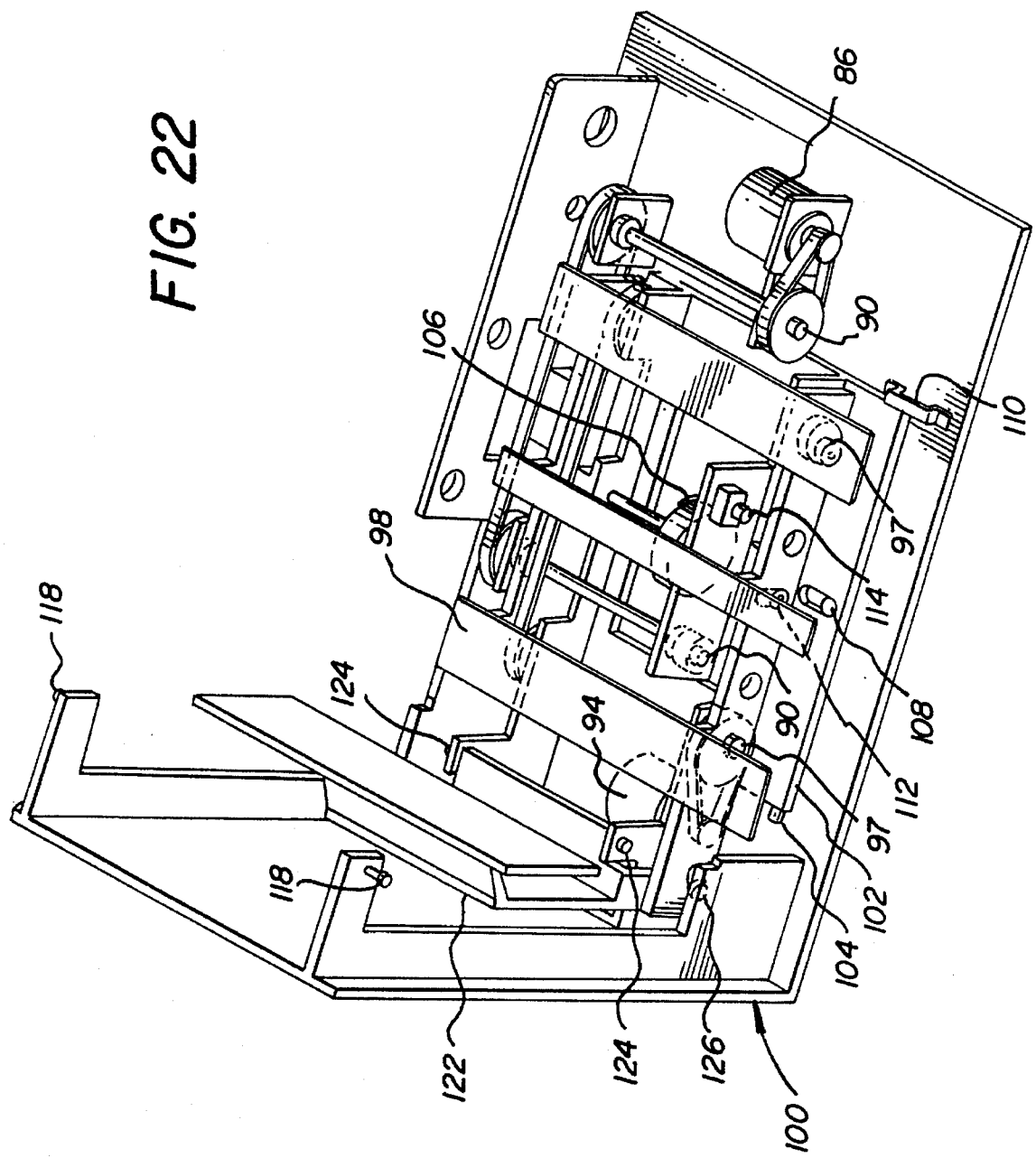
Figure 23:
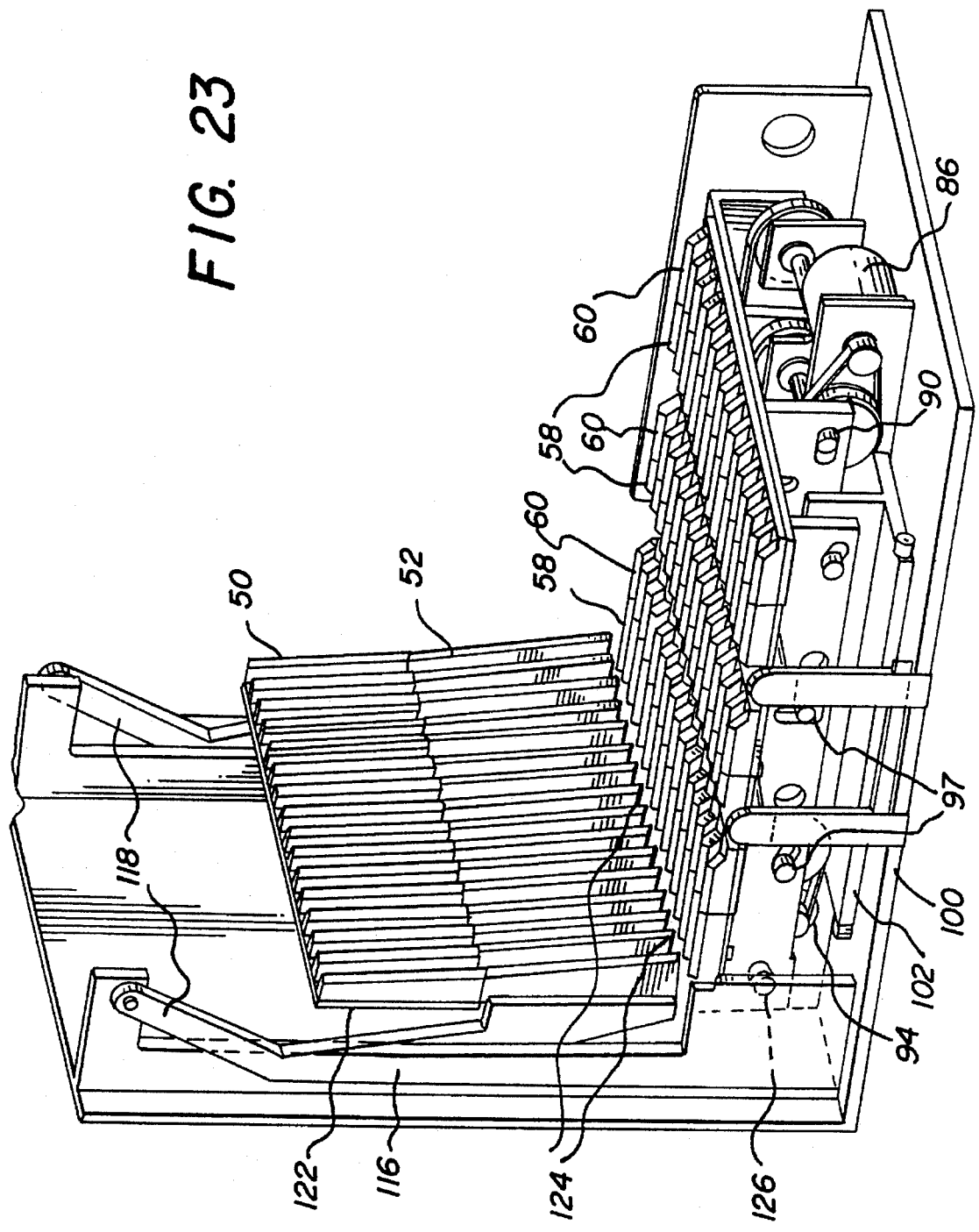

A preferred mechanism for accomplishing the actuation sequence described in FIG. 19 is shown in FIGS. 20–24. Referring to FIG. 20, three stepper motors are used to accomplish the indexing operation. The motors are controlled by control electronics 23 (FIG. 3) including, for example, a microprocessor, microcontroller or discrete logic circuits, which control the overall operation of the vertical autoloader 40. Positions of various components of the vertical autoloader 40 are detected by sensors in a conventional manner, whose outputs are supplied to the control electronics 23. A separator motor 86 is used to drive a set of shafts 88, which in turn are used to drive a bottom separator support 92 (shown in FIG. 21) up and down by means of eccentric cam followers 90 located at the ends of the shafts 88. In a similar fashion, an indexer retraction motor 94 is used to drive another set of shafts 96 to actuate a bottom indexer support 98 (shown in FIG. 22) up and down by means of eccentric cam followers 97 located on the shafts 96. The shafts 88 actuated by the separator motor 86 are mounted on a fixed base 100. The shafts 96 driven by the indexer retraction motor 94 are mounted on an indexing frame 102 that is translated sideways on indexing wheels 104, located at the four corners of the indexing frame 102, by one cassette position by an indexer translation motor 106 (preferably a linear actuator). Indexer frame guides 108 are provided that, in combination with the indexing frame support wheels 104 which are held down by wheel hold down straps 110, restrict the indexing frame 102 to the one degree of freedom relative to the fixed base 100. Indexer support guides 112 and separator support guides 114, riding in corresponding guide slots, restrict the motion of the bottom indexer support 98 and the bottom separator support 92 to vertical travel relative to their corresponding eccentrics. In the illustrated embodiment, the retraction movement of the rear separator 52 and rear indexer 50 is actuated by cam linkages driven by the vertical movement of the bottom separator support 92 and bottom indexer support 98. Specifically, a rear separator support 116 is coupled to the fixed base 100 at pivot points 118 and to the bottom separator support 92 via a separator cam linkage 120. A rear indexer support 122 is coupled to the indexing frame 102 at pivot points 124 and to the bottom indexer support 98 via an indexer cam linkage 126. The rear indexer 50 and the rear separator 52 are then respectively coupled to the rear indexer support 122 and the rear separator support 116, and the indexer elements 58 and separator elements 60 of the bottom indexer 54 and the bottom separator 56 are coupled to the bottom indexer support 98 and the bottom separator support 92 as shown in FIG. 23.

Figure 24:
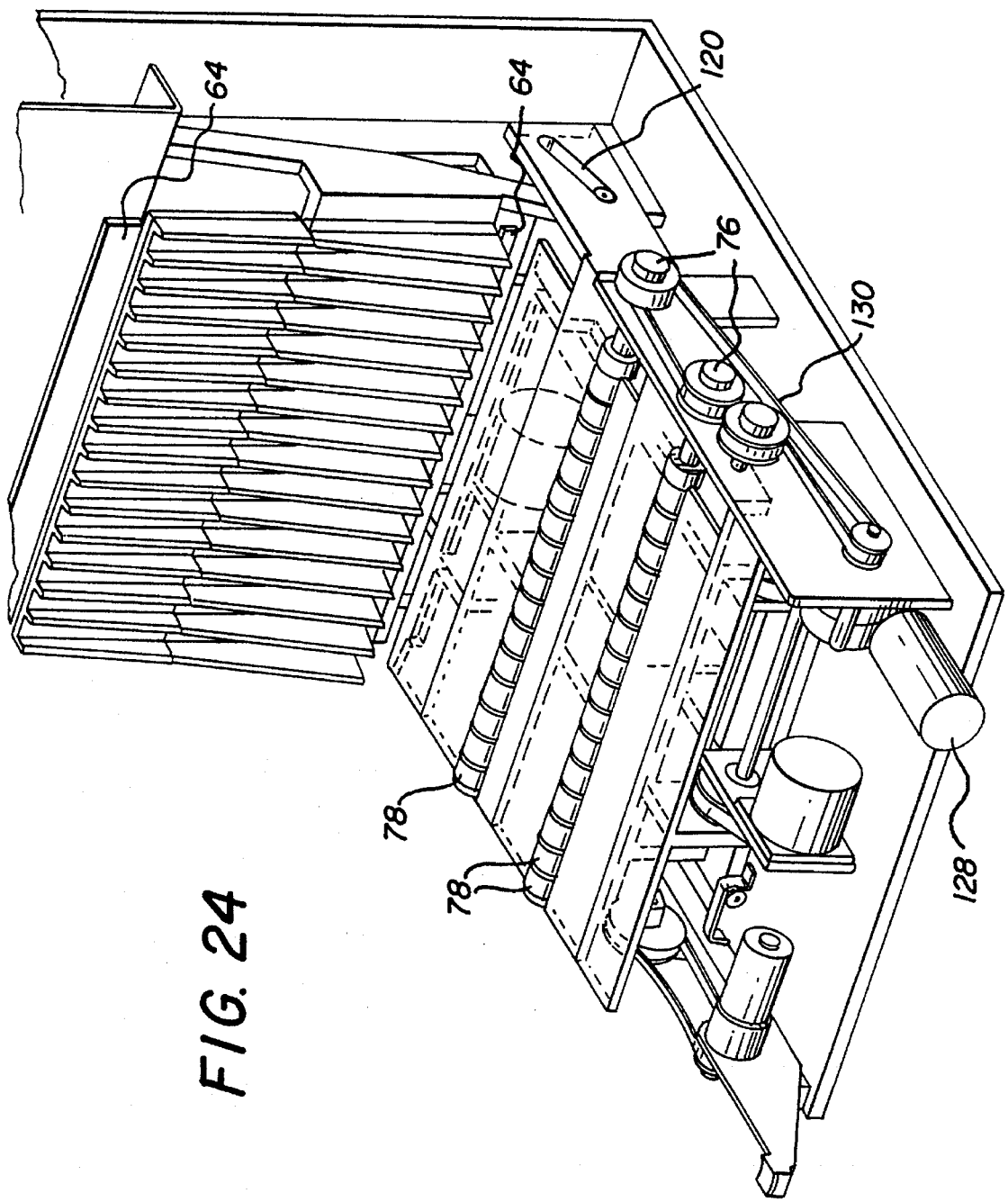
Figure 25:
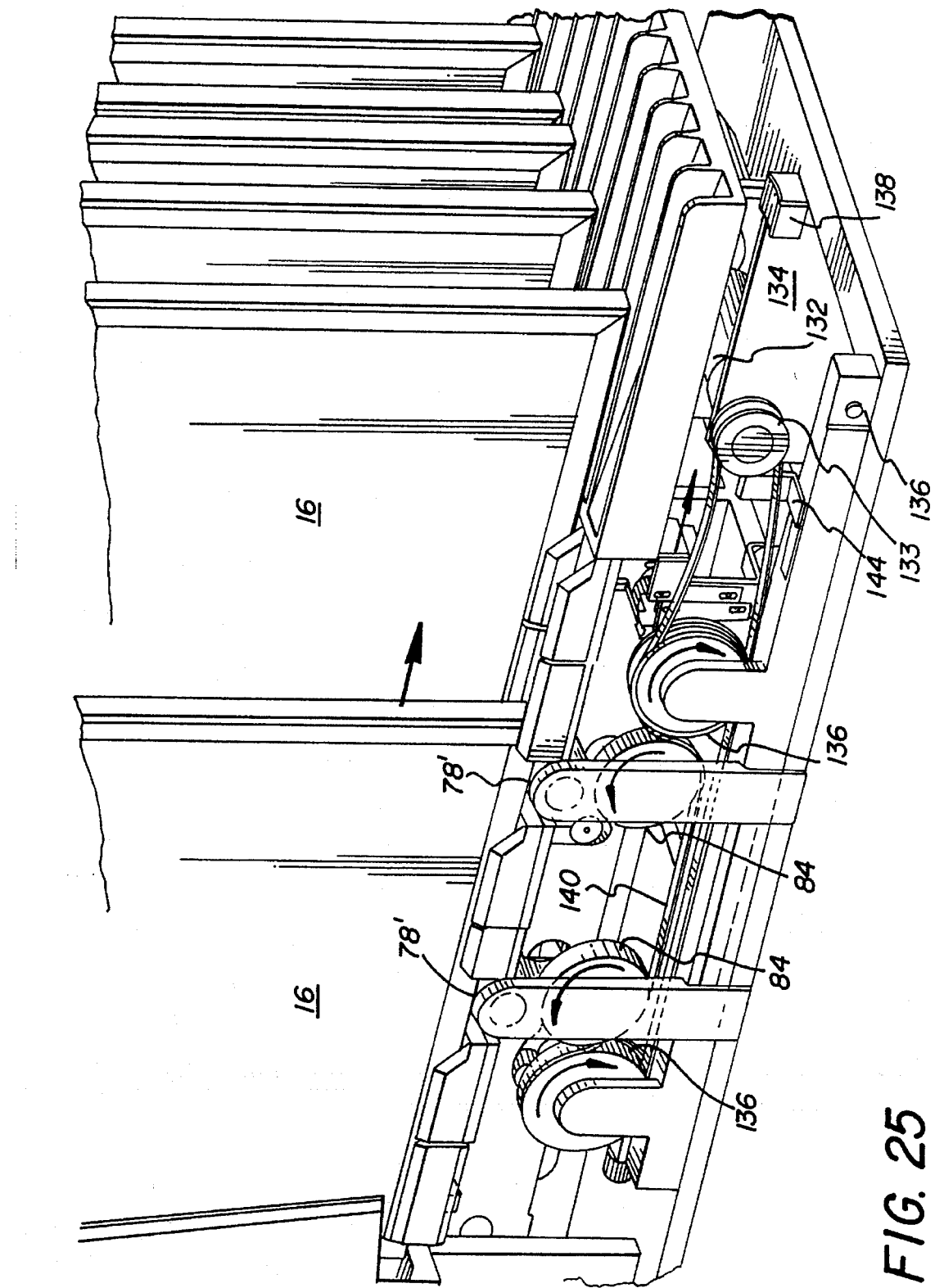
FIG. 25 is a perspective view of an ejection mechanism incorporated in the loading station illustrated in FIG. 4.

The drive roller assembly is shown in FIG. 24. A drive motor 128 is used to power the drive shafts 76, via a roller drive belt 130, which transfer driving torque to the drive rollers 78. FIG. 24 also illustrates the mechanism used to power the ejection drive wheel 84 which is used to eject a cassette as previously described with reference to FIG. 18. As shown in greater detail in FIG. 25, the mechanism includes a motor 132 that drives a tension pulley 133 that is mounted on a pivot plate 134. The pivot plate 134 pivots about a pivot point 136 when an operator presses down on a finger support 138. Movement of the pivot plate 134 activates a microswitch 144 which turns on the motor 132, and also causes a drive belt 140 that is threaded around the tension pulley 133, idler pulleys 136 and drive wheels 84 to tighten. The tightening of the drive belt 140 forces the drive wheels 84 upward and into contact with the drive rollers 78' located adjacent to the read site. The drive wheels 84 are driven in a counter-clockwise rotation which, in turn, imparts a clockwise rotation to the drive rollers 78' causing a cassette 16 located on top of the drive rollers 78' in a cassette slot adjacent to the read site to be ejected.

As was stated above, the structure and operation of the unloading station 46 is essentially identical to the operation of the loading station 44. The unloading station 46 can be simplified, however, by omitting the transport rollers 62 as the registration of the cassettes is not as critical once they have been removed from the read site. In addition, the mechanism for ejecting a cassette can also be removed, as it may not be required on the downstream side of the read site.

In addition to overcoming the requirement for the use of pallets to handle different size cassettes, the vertical autoloader 40 allows the amount of floorspace required for the combined vertical autoloader and scanner unit to be reduced from conventional systems. The reduction in floorspace results from the movement of plates between the read unit 18 and the erase unit 20 in a vertical plane, as opposed to movement in a horizontal plane in the conventional system illustrated in FIG. 1.

Figure 26:
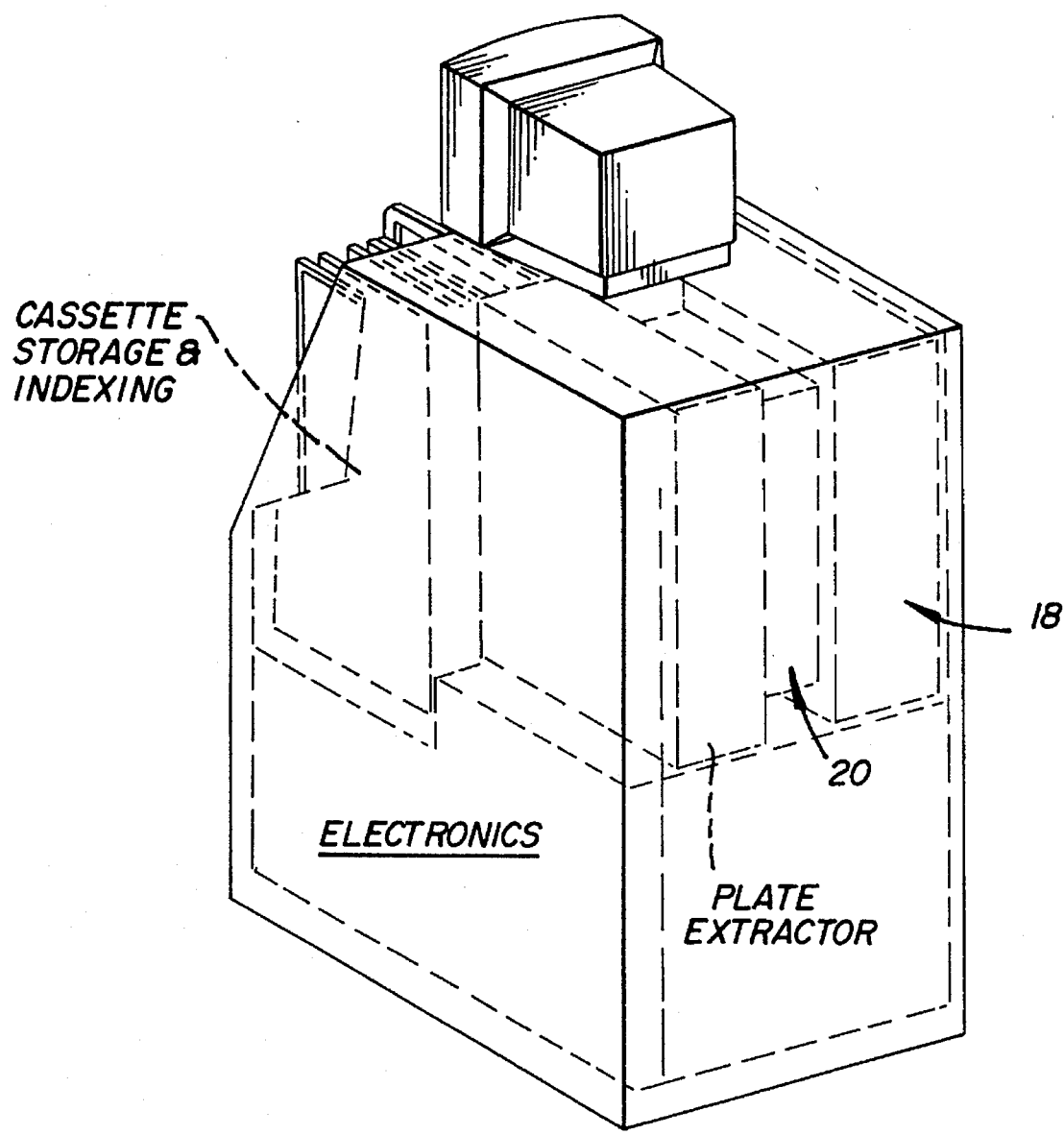
FIG. 26 illustrates a second embodiment of a vertical autoloader coupled to a scanner unit in accordance with the invention.

The vertical autoloader 40 can be utilized with a variety of scanner configurations. The erase unit and read unit can be configured as shown in FIG. 26 such that the read unit 18 scans a plate as the extractor mechanism pulls the plate from the cassette, by placing the scanning portion of the read unit 18 in front of the erase unit 20. In addition, the vertical autoloader 40 can be configured so that the plates are extracted from the cassettes vertically rather than horizontally.

Figure 27:
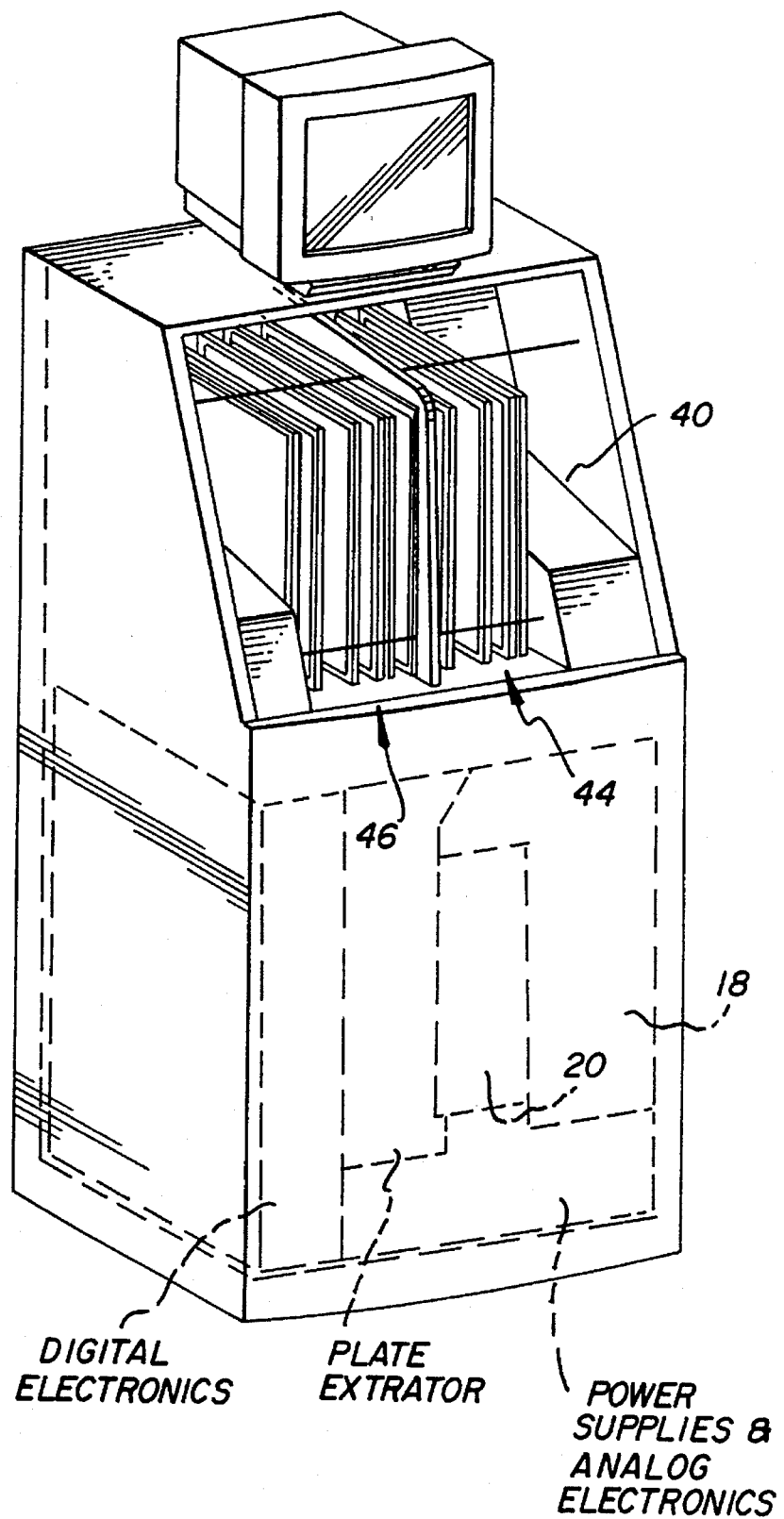
FIG. 27 illustrates a third embodiment of a vertical autoloader coupled to a scanner unit in accordance with the invention.

In the embodiment illustrated in FIG. 27, for example, the vertical autoloader 10 is configured above the erase unit 20 and the read unit 18, which have been rotated by 90 degrees from the embodiment illustrated in FIG. 26. In operation, a cassette 16 is indexed to a read site by the vertical autoloader 40. The plate is vertically extracted from the cassette by an extractor mechanism of the type previously described. The plate is scanned by the read unit 18 as it is extracted. Once fully extracted and scanned, the plate is erased by the erase unit 20. The plate is then vertically inserted back into the cassette 16 and transferred from the read site to the unloading station 46.

Figure 28:
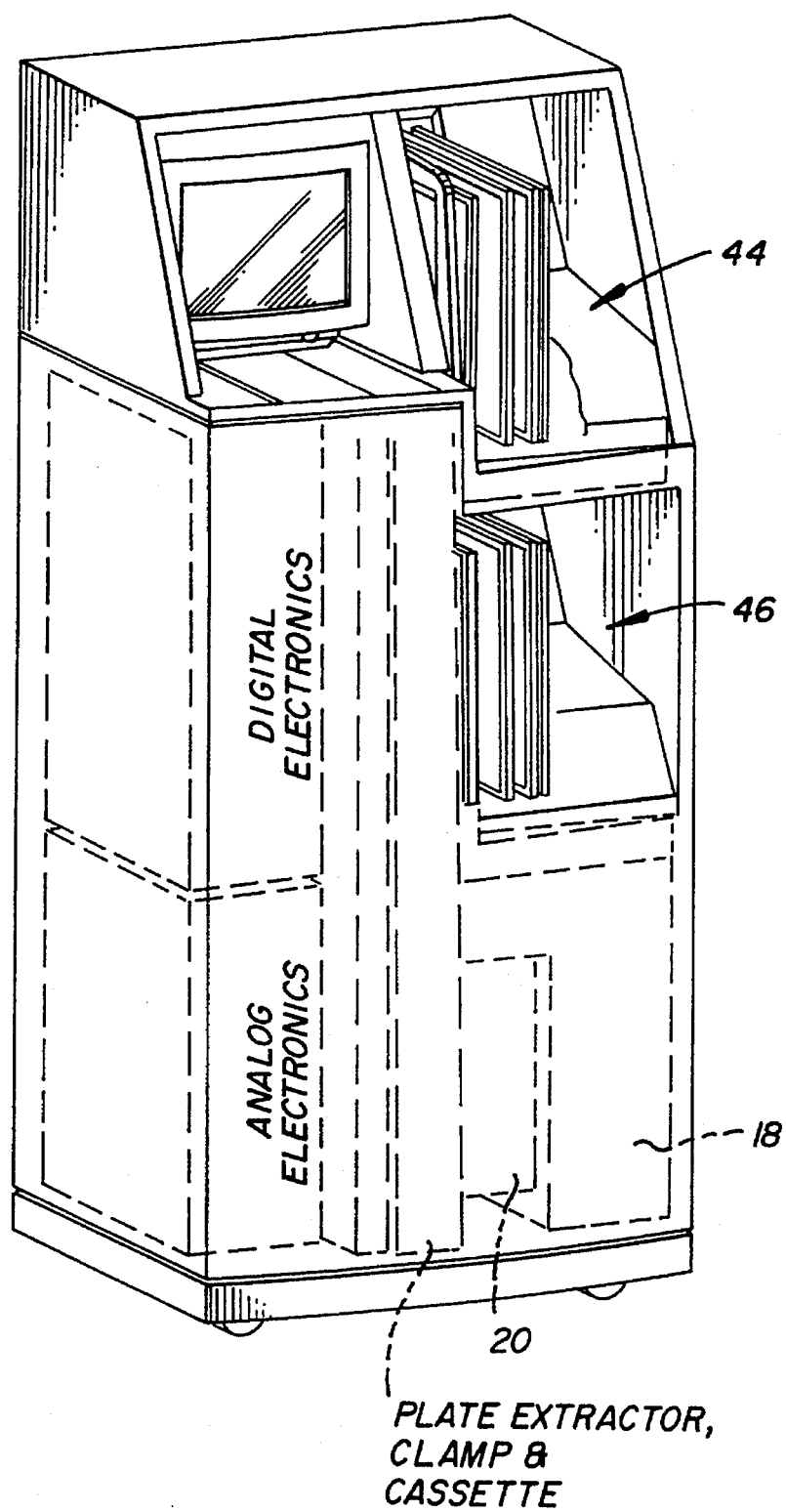
FIGS. 28 and 29 are perspective views of a fourth embodiment of a vertical autoloader coupled to a scanner unit in accordance with the invention.
Figure 29:
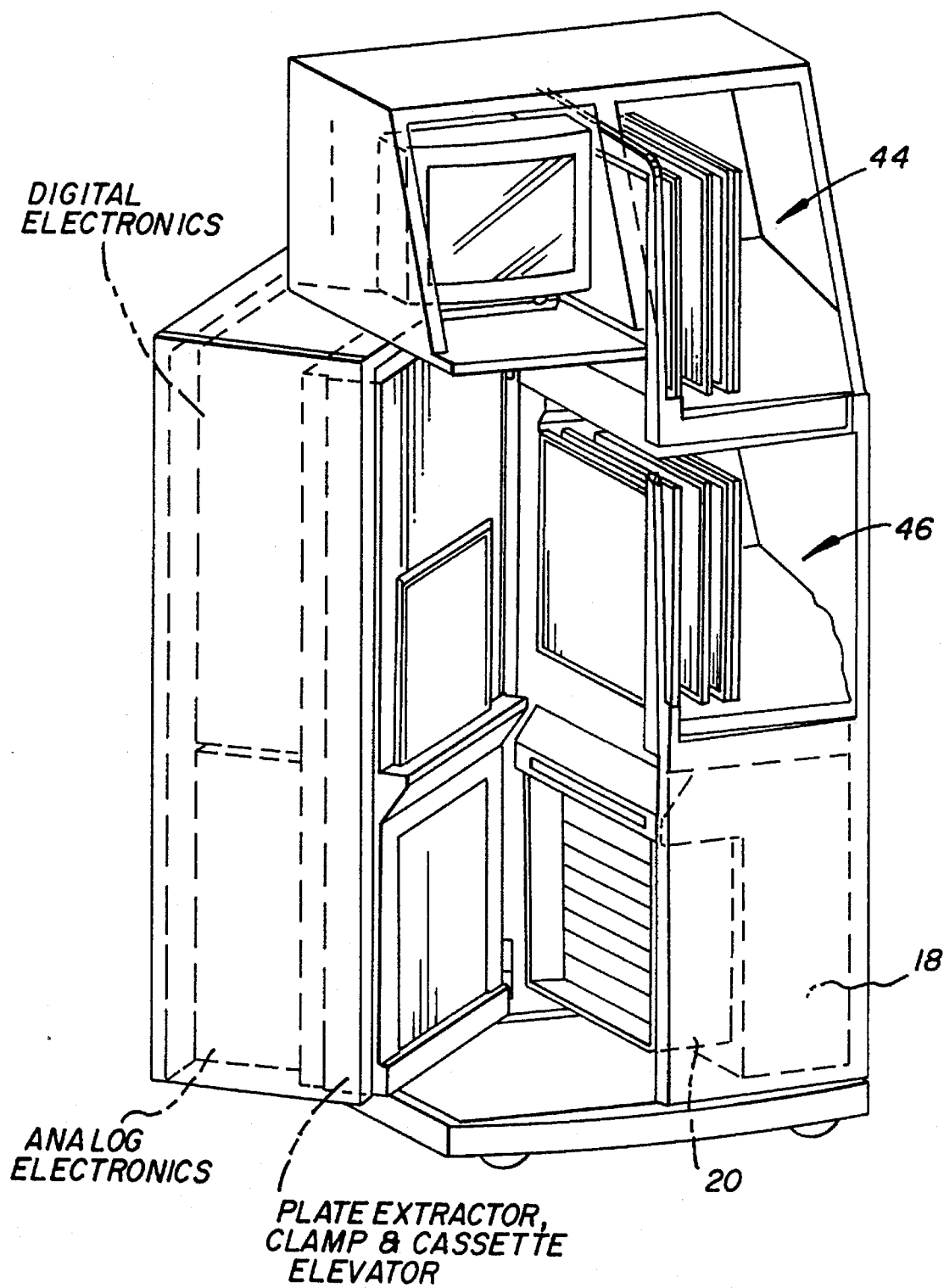

Still further, the loading station 44 and the unloading station 46 of the vertical autoloader 40 can be stacked rather than located side-by-side as shown in embodiment illustrated in FIGS. 28. As shown in FIG. 29, the plate extractor mechanism and electronics can then hinged for easy service access. In this embodiment, the cassette is received from a read site of the loading station 44 at a first horizontal level and transferred to a clamp mechanism located at a second horizontal level adjacent to the unloading station 46. The plate is then vertically extracted by an extractor mechanism and scanned during extraction by the read unit 18. Once fully scanned and erased, the plate is vertically inserted back into the cassette and the cassette is transferred to the unloading station 46.

Figure 30:
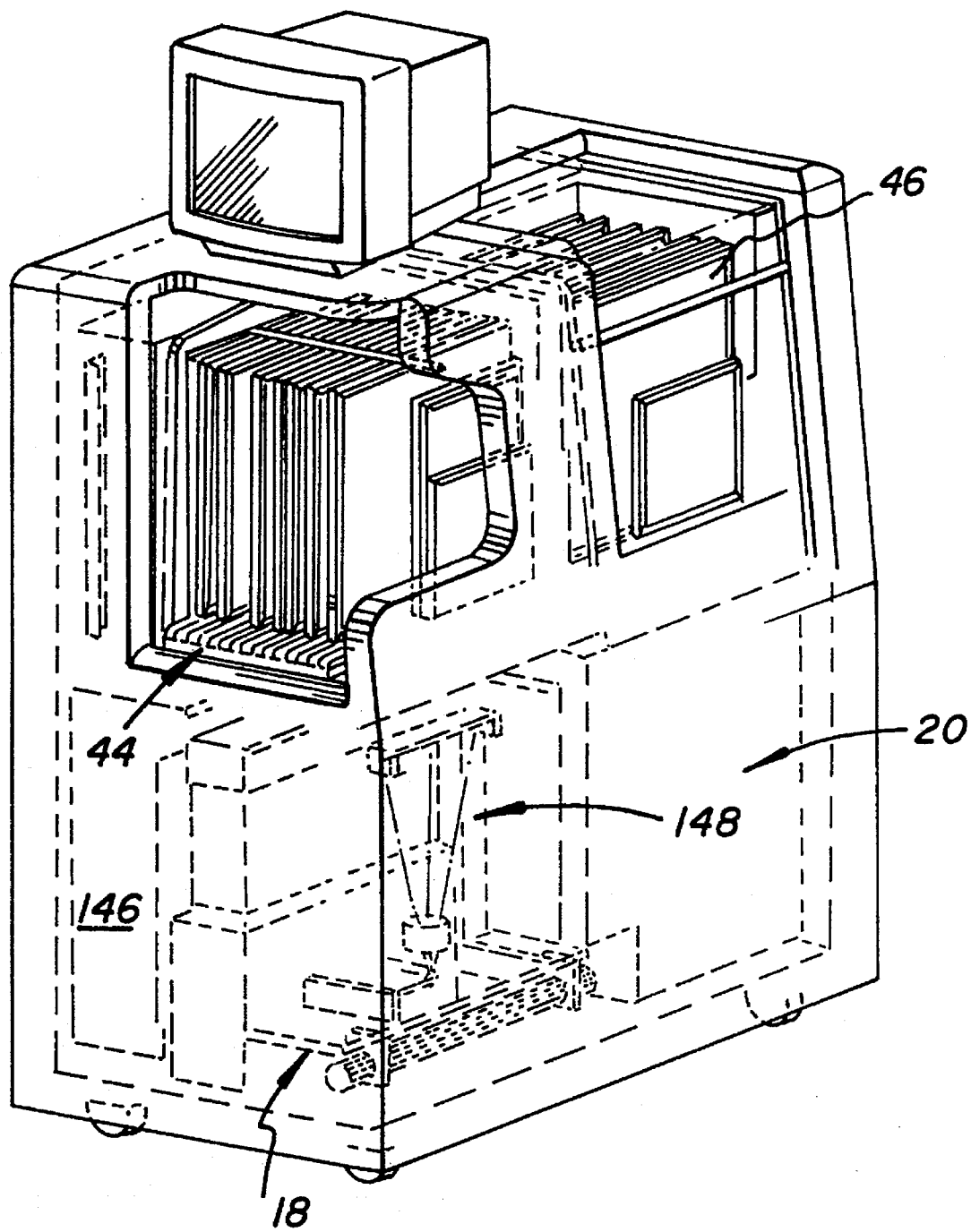
FIG. 30 is a perspective view of a fifth embodiment of a vertical autoloader coupled to a scanner unit in accordance with the invention.

Finally, the loading station 44 and unloading station 46 can be located back-to-back as shown in the embodiment illustrated in FIG. 30. This embodiment, however, would require two extraction mechanisms, a first extraction mechanism 146 to extract plates from a read site in the loading station 44 past the read unit 18 and a second extraction mechanism 148 to extract plates from a "read" site in the unloading station 46 to present them to the erase unit 20, after a transport mechanism had horizontally transferred a cassette from the loading station 44 to the unloading station 46. In operation, a cassette is indexed to a read site by the loading station 44. The first extraction mechanism 146 then vertically extracts the plate from the cassette and the plate is scanned during extraction by the read unit 18. The plate is then vertically inserted back into the cassette and the cassette is transferred to a "read" site of the unloading station 46. The second extraction mechanism 148 then vertically extracts the plate from the cassette for presentation to the erase unit 20.

In the embodiments illustrated in FIGS. 27–30, the cassettes are loading into the vertical autoloader 40 such that an extraction reference edge of the cassette faces downward. Such configurations provide additional advantages. For example, the configurations in which the plate is read while being extracted down into the read unit 18 provide the most compact autoloader/scanner combination, with floorspace footprints of under six square feet. The configuration in FIG. 30 permits an erase operation to be performed on one plate while another plate is being scanned, thereby reducing the overall processing cycle time.

The vertical autoloader of the invention permits the development of a variety of compact storage phosphor readers which do not require the use of pallets or other adapters to handle a wide range of cassette sizes. Avoiding the need of using pallets is a significant time and equipment cost saving for the customer. Avoiding the need for pallets also improves system reliability, since pallets are damage and distortion prone and are subject to being improperly used by the customer.

The invention has been described with reference to certain preferred embodiments thereof. It will be understood, however, that modifications and variations are possible within the scope of the appended claims. The specific mechanical structures, for example, used to move the rear indexer and separator and the bottom indexer and separator can be varied. The number of indexer and separator elements utilized in the rear indexer and separator, as well as the number of transport rollers, can also be varied. The mechanism used to rotate the ejection drive wheel is also not limited to the specifically disclosed embodiment, but can incorporate any desired mechanism for rotating the ejection drive wheel to drive the drive rollers in an ejection direction. Further, although the vertical autoloader/scanner configurations illustrate extracting the plate downward and inserting the plate upward, the autoloader could be located beneath the read unit and erase unit so that the plate is extracted upward and inserted downward.

Figure 31:
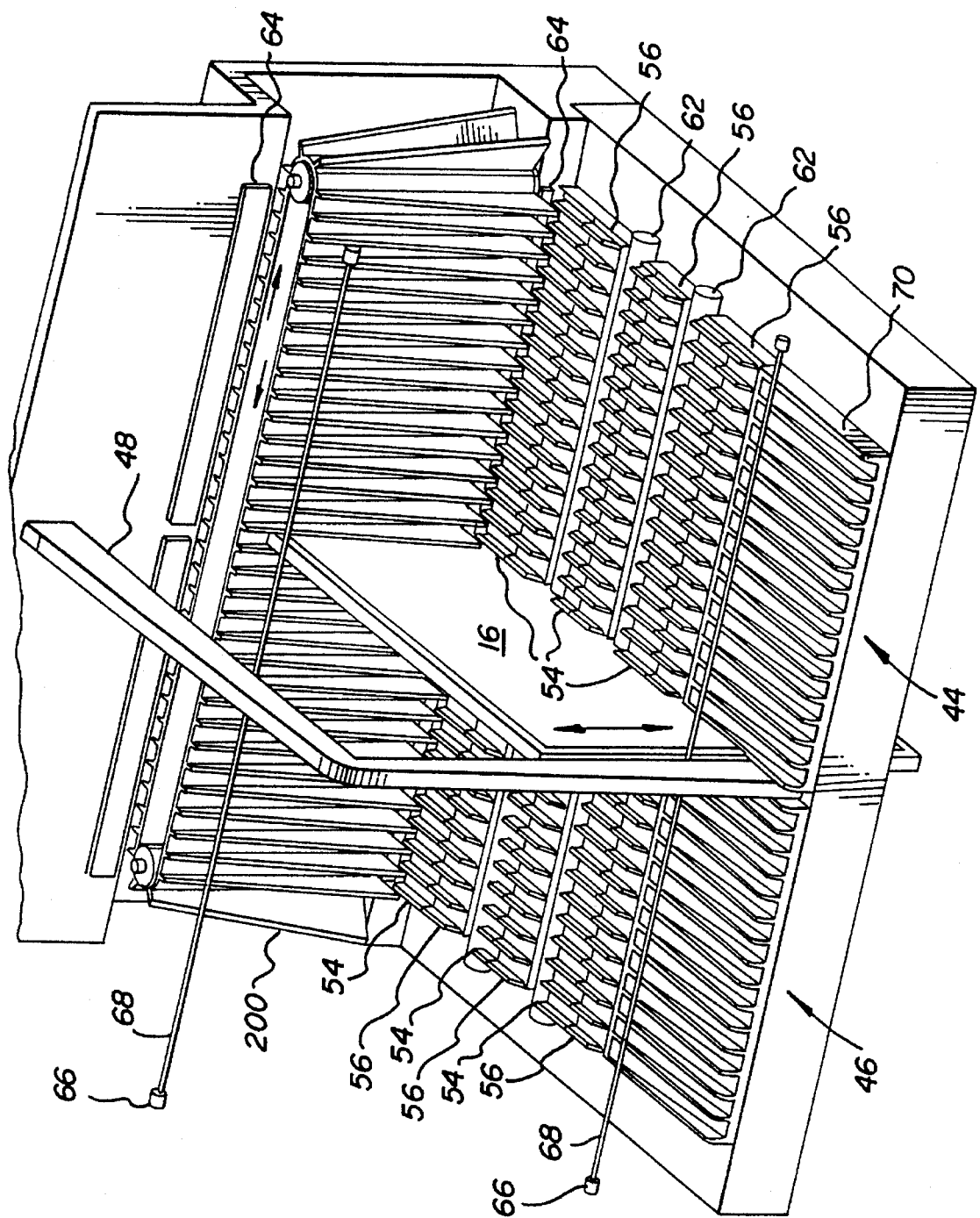
FIG. 31 is a isometric view of a belt useful with the indexer of the invention.

It should also be noted that the retracting partition indexer described above could be used in some applications in combination with an indexing belt of the type used in the conventional autoloader shown in FIG. 1, be reoriented. For instance in an indexer for a scanner of the configuration shown in FIG. 3 and 26, a continuous partitioned convey or belt could be used under the cassettes with a retracting partition indexer used behind them on the vertical wall. For FIGS. 27 and 28 configurations a partitioned conveyor belt 200 could be used behind the cassettes, e.g., as shown in FIG. 31, for the vertical partitions with the retracting partition indexers described above, used under the cassettes. The pitch of belt partitions and retracting partitions would, of course, have to match and their indexing motion be synchronized.

What is claimed is:

1. An apparatus for indexing a stack of vertically positioned cassettes comprising:

a separator mechanism including a plurality of partitions that define a plurality of slots;

an indexer mechanism including a plurality of partitions that define a plurality of slots corresponding to the slots defined by the partitions of the separator mechanism;

indexer drive means for moving the indexer mechanism with respect to a home position of the separator mechanism, wherein the slots defined by the partitions of the indexer mechanism are moved by one position with respect to the slots defined by the partitions of the separator mechanism; and separator drive means for moving the separator mechanism with respect to a home position of the indexer mechanism, wherein bottom surfaces of the slots defined by the partitions of the separator mechanism are located in a different plane than a plane in which the bottom surface of the slots defined by the partitions of the indexer mechanism are located.

2. An apparatus as claimed in claim 1, wherein the separator mechanism includes a rear separator and a bottom separator and the indexer mechanism includes a rear indexer and a bottom indexer.

3. An apparatus as claimed in claim 2, wherein the slots defined by the partitions of the separator and indexer mechanisms include horizontally oriented slots formed by the partitions of the bottom separator and bottom indexer and vertically oriented slots formed by the partitions of the rear separator and rear indexer.

4. An apparatus as claimed in claim 3, further comprising at least one transport roller extending perpendicular to the horizontally oriented slots, and means for driving the transport roller.

5. An apparatus as claimed in claim 4, wherein the transport roller includes a plurality of drive rollers mounted to a drive shaft, each of the drive rollers corresponding to one of the horizontally oriented slots.

6. An apparatus as claimed in claim 5, wherein the interface of the drive rollers to the drive shaft comprises a slip clutch.

7. An apparatus as claimed in claim 5, further comprising ejection means for driving at least one of the drive rollers in an ejection direction.

8. An apparatus as claimed in claim 7, wherein the ejection means comprises a motor mounted on a pivot plate, at least one drive wheel, and a drive belt that is driven by the motor, wherein the drive belt is brought into contact with the drive wheel when the pivot plate is pivoted about a pivot point, thereby causing the drive wheel to rotate and contact at least one drive roller.

9. An apparatus as claimed in claim 2, wherein the separator drive means moves the bottom separator vertically and the indexer drive means moves the bottom indexer horizontally.

10. An apparatus as claimed in claim 9, wherein the indexer drive means further moves the bottom indexer vertically.

11. An apparatus as claimed in claim 9, wherein the indexer drive means moves the rear indexer in a first horizontal direction and a second horizontal direction perpendicular to the first horizontal position, and the separator drive means moves the rear separator in the second horizontal direction.

12. An apparatus as claimed in claim 2, wherein the bottom separator includes a plurality of separator elements and the bottom indexer includes a plurality of indexer elements.

13. In an apparatus for reading storage phosphorous elements contained in protective cassettes, said apparatus comprising:

an autoloading apparatus for automatically indexing a plurality of cassettes to a read site; an extraction mechanism for extracting the storage phosphorous elements from the cassettes at the read site and replacing the storage phosphorous elements into the cassettes; a read unit for scanning the storage phosphorous elements after extraction from the cassettes; and an erase unit for erasing the storage phosphorus elements after scanning by the read unit;

the improvement wherein the autoloading apparatus includes a separator mechanism comprising a plurality of partitions that define a plurality of slots; an indexer mechanism including a plurality of partitions that define a plurality of slots corresponding to the slots defined by the partitions of the separator mechanism; an indexer drive means for moving the indexer mechanism with respect to a home position of the separator mechanism, wherein the slots defined by the partitions of the indexer mechanism are moved by one position with respect to the slots defined by the partitions of the separator mechanism; and a separator drive means for moving the separator mechanism with respect to a home position of the indexer mechanism, wherein bottom surfaces of the slots defined by the partitions of the separator mechanism are located in a different plane than a plane in which the bottom surface of the slots defined by the partitions of the indexer mechanism are located.

14. An apparatus as claimed in claim 13, wherein the separator mechanism includes a rear separator and a bottom separator and the indexer mechanism includes a rear indexer and a bottom indexer.

15. An apparatus as claimed in claim 14, wherein the slots defined by the partitions of the separator and indexer mechanisms include horizontally oriented slots formed by the partitions of the bottom separator and indexer and vertically oriented slots formed by the partitions of the rear separator and indexer.

16. An apparatus as claimed in claim 15, further comprising at least one transport roller extending perpendicular to the horizontally oriented slots, and means for driving the transport roller.

17. An apparatus as claimed in claim 16, wherein the transport roller includes a plurality of drive rollers mounted to a drive shaft, each of the drive rollers corresponding to one of the horizontally oriented slots.

18. An apparatus as claimed in claim 17, wherein the interface of the drive rollers to the drive shaft comprises a slip clutch.

19. An apparatus as claimed in claim 17, further comprising ejection means for driving at least one of the drive rollers in an ejection direction.

20. An apparatus as claimed in claim 19, wherein the ejection means comprises a motor mounted on a pivot plate, at least one drive wheel, and a drive belt that is driven by the motor, wherein the drive belt is brought into contact with the drive wheel when the pivot plate is pivoted about a pivot point, thereby causing the drive wheel to rotate and contact at least one drive roller.

21. An apparatus as claimed in claim 14, wherein the separator drive means moves the bottom separator vertically and the indexer drive means moves the bottom indexer vertically and horizontally.

22. An apparatus as claimed in claim 21, wherein the indexer drive means moves the rear indexer in a first horizontal direction and a second horizontal direction, and the separator drive means moves the rear separator in the second horizontal direction.

23. An apparatus as claimed in claim 14, wherein the bottom separator includes a plurality of separator elements and the bottom indexer includes a plurality of indexer elements.

24. A method of reading and erasing a storage phosphor plate stored in a cassette comprising the steps of:

a. indexing a cassette to a read site with an indexing mechanism;

b. extracting a plate from the cassette in a vertical direction with an extraction mechanism;

c. scanning the plate with a read unit to generate electronic data representative of an image;

d. erasing the plate with an erase unit;

e. inserting the plate back into the cassette in a vertical direction with the extraction mechanism; and f. transferring the cassette to an unloading position with an indexing mechanism.

25. A method as defined in claim 24, wherein the step of scanning the plate with a read unit is performed as the plate is being extracted from the cassette.

26. A method as defined in claim 24, wherein the step of indexing the cassette to the read site is performed at a first horizontal level and the step of transferring the cassette to an unloading position is performed at a second horizontal level.

27. A method as defined in claim 24, wherein the step of extracting the plate comprises pulling the plate downward out of the cassette and the step of inserting the plate comprises inserting the plate upward into the cassette.

28. A method of reading and erasing a storage phosphor plate stored in a cassette comprising the steps of:

a. indexing a cassette to a read site in a loading station;

b. extracting a plate from the cassette in a vertical direction with a first extraction mechanism;

c. scanning the plate with a read unit to generate electronic data representative of an image;

d. inserting the plate back into the cassette in a vertical direction with the first extraction mechanism;

e. transferring the cassette horizontally to an unloading station;

f. extracting the plate from the cassette in a vertical direction with a second extraction mechanism;

g. erasing the plate with an erase unit; and h. inserting the plate back into the cassette in a vertical direction with the second extraction mechanism.

29. A method as defined in claim 28, wherein the step of scanning the plate with a read unit is performed as the plate is being extracted from the cassette by the first extraction mechanism.

30. A method of reading and erasing a storage phosphor plate stored in a cassette comprising the steps of:

a. indexing a cassette to a read site with an indexing mechanism;

b. extracting a plate from the cassette in a horizontal direction with an extraction mechanism;

c. transferring the plate in a vertical direction to a read unit;

d. scanning the plate with the read unit to generate electronic data representative of an image;

e. transferring the plate to an erase unit in a vertical direction;

f. erasing the plate with the erase unit; and g. inserting the plate back into the cassette in a horizontal direction.

31. A method of reading and erasing a storage phosphor plate stored in a cassette comprising the steps of:

a. indexing a cassette to a read site with an indexing mechanism;

b. extracting a plate from the cassette in a horizontal direction with an extraction mechanism;

c. scanning the plate with the read unit as the plate is extracted by the extracted mechanism;

d. erasing the plate with the erase unit after the plate is scanned by the read unit; and e. inserting the plate back into the cassette in a horizontal direction.

* * * * *